(12) United States Patent
Feller et al.

(10) Patent No.: US 8,265,826 B2
(45) Date of Patent: *Sep. 11, 2012

(54) COMBINED GNSS GYROSCOPE CONTROL SYSTEM AND METHOD

(75) Inventors: Walter J. Feller, Airdrie (CA); Michael L. Whitehead, Scottsdale, AZ (US); John A. McClure, Scottsdale, AZ (US)

(73) Assignee: Hemisphere GPS, LLC, Calgary, Alberta (CA)

( * ) Notice: Subject to any disclaimer, the term of this patent is extended or adjusted under 35 U.S.C. 154(b) by 904 days.

This patent is subject to a terminal disclaimer.

(21) Appl. No.: 12/171,399

(22) Filed: Jul. 11, 2008

(65) Prior Publication Data

US 2008/0269988 A1 Oct. 30, 2008

Related U.S. Application Data

(63) Continuation-in-part of application No. 10/804,758, filed on Mar. 19, 2004, now Pat. No. 7,400,956, and a continuation-in-part of application No. 10/828,745, filed on Apr. 21, 2004, now abandoned.

(60) Provisional application No. 60/456,146, filed on Mar. 20, 2003, provisional application No. 60/464,756, filed on Apr. 23, 2003.

(51) Int. Cl.
*G01C 21/00* (2006.01)
*G05D 1/00* (2006.01)

(52) U.S. Cl. ............ 701/41; 701/50; 701/470; 701/472; 701/500

(58) Field of Classification Search .................. None
See application file for complete search history.

(56) References Cited

U.S. PATENT DOCUMENTS 3,585,537 A 6/1971 Rennick et al.
(Continued)

FOREIGN PATENT DOCUMENTS

JP 07244150 9/1995
(Continued)

OTHER PUBLICATIONS

Parkinson, Bradford W., et al., "Global Positioning System: Theory and Applications, vol. II", Bradford W. Parkinson and James J. Spiker, Jr., eds., *Global Postioning System: Theory and Applicaitons*, vol. II, 1995, AIAA, Reston, VA, USA, pp. 3-50, (1995),3-50.

(Continued)

*Primary Examiner* — Michael J. Zanelli
(74) *Attorney, Agent, or Firm* — Law Office of Mark Brown, LLC; Mark E. Brown

(57) ABSTRACT

A global navigation satellite sensor system (GNSS) and gyroscope control system for vehicle steering control comprising a GNSS receiver and antennas at a fixed spacing to determine a vehicle position, velocity and at least one of a heading angle, a pitch angle and a roll angle based on carrier phase position differences. The roll angle facilitates correction of the lateral motion induced position errors resultant from motion of the antennae as the vehicle moves based on an offset to ground and the roll angle. The system also includes a control system configured to receive the vehicle position, heading, and at least one of roll and pitch, and configured to generate a steering command to a vehicle steering system. The system includes gyroscopes for determining system attitude change with respect to multiple axes for integrating with GNSS-derived positioning information to determine vehicle position, velocity, rate-of-turn, attitude and other operating characteristics. A vehicle control method includes the steps of computing a position and a heading for the vehicle using GNSS positioning and a rate gyro for determining vehicle attitude, which is used for generating a steering command.

19 Claims, 10 Drawing Sheets

U.S. PATENT DOCUMENTS

| | | |
|---|---|---|
| 3,596,228 A | 7/1971 | Reed, Jr. et al. |
| 3,727,710 A | 4/1973 | Sanders et al. |
| 3,815,272 A | 6/1974 | Marleau |
| 3,899,028 A | 8/1975 | Morris et al. |
| 3,987,456 A | 10/1976 | Gelin |
| 4,132,272 A | 1/1979 | Holloway et al. |
| 4,170,776 A | 10/1979 | Frosch et al. |
| 4,180,133 A | 12/1979 | Collogan et al. |
| 4,398,162 A | 8/1983 | Nagai |
| 4,453,614 A | 6/1984 | Allen et al. |
| 4,529,990 A | 7/1985 | Brunner |
| 4,637,474 A | 1/1987 | Leonard |
| 4,667,203 A | 5/1987 | Counselman, III |
| 4,689,556 A | 8/1987 | Cedrone |
| 4,694,264 A | 9/1987 | Owens et al. |
| 4,710,775 A | 12/1987 | Coe |
| 4,714,435 A | 12/1987 | Stipanuk et al. |
| 4,739,448 A | 4/1988 | Rowe et al. |
| 4,751,512 A | 6/1988 | Longaker |
| 4,769,700 A | 9/1988 | Pryor |
| 4,785,463 A | 11/1988 | Janc et al. |
| 4,802,545 A | 2/1989 | Nystuen et al. |
| 4,812,991 A | 3/1989 | Hatch |
| 4,858,132 A | 8/1989 | Holmquist |
| 4,864,320 A | 9/1989 | Munson et al. |
| 4,894,662 A | 1/1990 | Counselman |
| 4,916,577 A | 4/1990 | Dawkins |
| 4,918,607 A | 4/1990 | Wible |
| 4,963,889 A | 10/1990 | Hatch |
| 5,031,704 A | 7/1991 | Fleischer et al. |
| 5,100,229 A | 3/1992 | Lundberg et al. |
| 5,134,407 A | 7/1992 | Lorenz et al. |
| 5,148,179 A | 9/1992 | Allison |
| 5,152,347 A | 10/1992 | Miller |
| 5,155,490 A | 10/1992 | Spradley et al. |
| 5,155,493 A | 10/1992 | Thursby et al. |
| 5,156,219 A | 10/1992 | Schmidt et al. |
| 5,165,109 A | 11/1992 | Han et al. |
| 5,173,715 A | 12/1992 | Rodal et al. |
| 5,177,489 A | 1/1993 | Hatch |
| 5,185,610 A | 2/1993 | Ward et al. |
| 5,191,351 A | 3/1993 | Hofer et al. |
| 5,202,829 A | 4/1993 | Geier |
| 5,207,239 A | 5/1993 | Schwitalia |
| 5,239,669 A | 8/1993 | Mason et al. |
| 5,255,756 A | 10/1993 | Follmer et al. |
| 5,268,695 A | 12/1993 | Dentinger et al. |
| 5,293,170 A | 3/1994 | Lorenz et al. |
| 5,294,970 A | 3/1994 | Dornbusch et al. |
| 5,296,861 A | 3/1994 | Knight |
| 5,311,149 A | 5/1994 | Wagner et al. |
| 5,323,322 A | 6/1994 | Mueller et al. |
| 5,334,987 A | 8/1994 | Teach |
| 5,343,209 A | 8/1994 | Sennott et al. |
| 5,345,245 A | 9/1994 | Ishikawa et al. |
| 5,359,332 A | 10/1994 | Allison et al. |
| 5,361,212 A | 11/1994 | Class et al. |
| 5,365,447 A | 11/1994 | Dennis |
| 5,369,589 A | 11/1994 | Steiner |
| 5,375,059 A | 12/1994 | Kyrtsos et al. |
| 5,390,124 A | 2/1995 | Kyrtsos |
| 5,390,125 A | 2/1995 | Sennott et al. |
| 5,390,207 A | 2/1995 | Fenton et al. |
| 5,416,712 A | 5/1995 | Geier et al. |
| 5,442,363 A | 8/1995 | Remondi |
| 5,444,453 A | 8/1995 | Lalezari |
| 5,451,964 A | 9/1995 | Babu |
| 5,467,282 A | 11/1995 | Dennis |
| 5,471,217 A | 11/1995 | Hatch et al. |
| 5,476,147 A | 12/1995 | Fixemer |
| 5,477,228 A | 12/1995 | Tiwari et al. |
| 5,477,458 A | 12/1995 | Loomis |
| 5,490,073 A | 2/1996 | Kyrtsos |
| 5,491,636 A | 2/1996 | Robertson et al. |
| 5,495,257 A | 2/1996 | Loomis |
| 5,504,482 A | 4/1996 | Schreder |
| 5,511,623 A | 4/1996 | Frasier |
| 5,519,620 A | 5/1996 | Talbot et al. |
| 5,521,610 A | 5/1996 | Rodal |
| 5,523,761 A | 6/1996 | Gildea |
| 5,534,875 A | 7/1996 | Diefes et al. |
| 5,543,804 A | 8/1996 | Buchler et al. |
| 5,546,093 A | 8/1996 | Gudat et al. |
| 5,548,293 A | 8/1996 | Cohen et al. |
| 5,561,432 A | 10/1996 | Knight |
| 5,563,786 A | 10/1996 | Torii |
| 5,568,152 A | 10/1996 | Janky et al. |
| 5,568,162 A | 10/1996 | Samsel et al. |
| 5,583,513 A | 12/1996 | Cohen |
| 5,589,835 A | 12/1996 | Gildea et al. |
| 5,592,382 A | 1/1997 | Colley |
| 5,596,328 A | 1/1997 | Stangeland et al. |
| 5,600,670 A | 2/1997 | Turney |
| 5,604,506 A | 2/1997 | Rodal |
| 5,608,393 A | 3/1997 | Hartman |
| 5,610,522 A | 3/1997 | Locatelli et al. |
| 5,610,616 A | 3/1997 | Vallot et al. |
| 5,610,845 A | 3/1997 | Slabinski |
| 5,612,883 A | 3/1997 | Shaffer et al. |
| 5,615,116 A | 3/1997 | Gudat et al. |
| 5,617,100 A | 4/1997 | Akiyoshi et al. |
| 5,617,317 A | 4/1997 | Ignagni |
| 5,621,646 A | 4/1997 | Enge et al. |
| 5,638,077 A | 6/1997 | Martin |
| 5,644,139 A | 7/1997 | Allen |
| 5,664,632 A | 9/1997 | Frasier |
| 5,673,491 A | 10/1997 | Brenna et al. |
| 5,680,140 A | 10/1997 | Loomis |
| 5,684,696 A | 11/1997 | Rao et al. |
| 5,706,015 A | 1/1998 | Chen et al. |
| 5,717,593 A | 2/1998 | Gvilli |
| 5,725,230 A | 3/1998 | Walkup |
| 5,731,786 A | 3/1998 | Abraham et al. |
| 5,739,785 A | 4/1998 | Allison |
| 5,757,316 A | 5/1998 | Buchler |
| 5,765,123 A | 6/1998 | Nimura et al. |
| 5,777,578 A | 7/1998 | Chang et al. |
| 5,810,095 A | 9/1998 | Orbach et al. |
| 5,828,336 A | 10/1998 | Yunck et al. |
| 5,838,562 A | 11/1998 | Gudat et al. |
| 5,854,987 A | 12/1998 | Sekine et al. |
| 5,862,501 A | 1/1999 | Talbot et al. |
| 5,864,315 A | 1/1999 | Welles et al. |
| 5,864,318 A | 1/1999 | Cosenza et al. |
| 5,875,408 A | 2/1999 | Bendett et al. |
| 5,877,725 A | 3/1999 | Kalafus |
| 5,890,091 A | 3/1999 | Talbot et al. |
| 5,899,957 A | 5/1999 | Loomis |
| 5,906,645 A | 5/1999 | Kagawa et al. |
| 5,912,798 A | 6/1999 | Chu |
| 5,914,685 A | 6/1999 | Kozlov et al. |
| 5,917,448 A | 6/1999 | Mickelson |
| 5,918,558 A | 7/1999 | Susag |
| 5,919,242 A | 7/1999 | Greatline et al. |
| 5,923,270 A | 7/1999 | Sampo et al. |
| 5,926,079 A | 7/1999 | Heine et al. |
| 5,927,603 A | 7/1999 | McNabb |
| 5,928,309 A | 7/1999 | Korver et al. |
| 5,929,721 A | 7/1999 | Munn et al. |
| 5,933,110 A | 8/1999 | Tang |
| 5,935,183 A | 8/1999 | Sahm et al. |
| 5,936,573 A | 8/1999 | Smith |
| 5,940,026 A | 8/1999 | Popeck |
| 5,941,317 A | 8/1999 | Mansur |
| 5,943,008 A | 8/1999 | Van Dusseldorp |
| 5,944,770 A | 8/1999 | Enge et al. |
| 5,945,917 A | 8/1999 | Harry |
| 5,949,371 A | 9/1999 | Nichols |
| 5,955,973 A | 9/1999 | Anderson |
| 5,956,250 A | 9/1999 | Gudat et al. |
| 5,969,670 A | 10/1999 | Kalafus et al. |
| 5,987,383 A | 11/1999 | Keller |
| 6,014,101 A | 1/2000 | Loomis |
| 6,014,608 A | 1/2000 | Seo |
| 6,018,313 A | 1/2000 | Engelmayer et al. |
| 6,023,239 A | 2/2000 | Kovach |
| 6,052,647 A | 4/2000 | Parkinson et al. |

| | | | | | | |
|---|---|---|---|---|---|---|
| 6,055,477 | A | 4/2000 | McBurney et al. | 6,703,973 B1 | 3/2004 | Nichols |
| 6,057,800 | A | 5/2000 | Yang et al. | 6,711,501 B2 | 3/2004 | McClure et al. |
| 6,061,390 | A | 5/2000 | Meehan et al. | 6,721,638 B2 | 4/2004 | Zeitler |
| 6,061,632 | A | 5/2000 | Dreier | 6,732,024 B2 | 5/2004 | Rekow et al. |
| 6,062,317 | A | 5/2000 | Gharsalli | 6,744,404 B1 | 6/2004 | Whitehead et al. |
| 6,069,583 | A | 5/2000 | Silvestrin et al. | 6,754,584 B2 | 6/2004 | Pinto et al. |
| 6,076,612 | A | 6/2000 | Carr et al. | 6,774,843 B2 | 8/2004 | Takahashi |
| 6,081,171 | A | 6/2000 | Ella | 6,792,380 B2 | 9/2004 | Toda |
| 6,100,842 | A | 8/2000 | Dreier et al. | 6,819,269 B2 | 11/2004 | Flick |
| 6,122,595 | A | 9/2000 | Varley et al. | 6,822,314 B2 | 11/2004 | Beasom |
| 6,128,574 | A | 10/2000 | Diekhans | 6,865,465 B2 | 3/2005 | McClure |
| 6,144,335 | A | 11/2000 | Rogers | 6,865,484 B2 | 3/2005 | Miyasaka et al. |
| 6,191,730 | B1 | 2/2001 | Nelson, Jr. | 6,900,992 B2 | 5/2005 | Kelly et al. |
| 6,191,733 | B1 | 2/2001 | Dizchavez | 6,922,635 B2 | 7/2005 | Rorabaugh |
| 6,198,430 | B1 | 3/2001 | Hwang et al. | 6,931,233 B1 | 8/2005 | Tso et al. |
| 6,198,992 | B1 | 3/2001 | Winslow | 6,967,538 B2 | 11/2005 | Woo |
| 6,199,000 | B1 | 3/2001 | Keller et al. | 6,990,399 B2 | 1/2006 | Hrazdera et al. |
| 6,205,401 | B1 | 3/2001 | Pickhard et al. | 7,006,032 B2 | 2/2006 | King et al. |
| 6,215,828 | B1 | 4/2001 | Signell et al. | 7,026,982 B2 | 4/2006 | Toda et al. |
| 6,229,479 | B1 | 5/2001 | Kozlov et al. | 7,027,918 B2 | 4/2006 | Zimmerman et al. |
| 6,230,097 | B1 | 5/2001 | Dance et al. | 7,031,725 B2 | 4/2006 | Rorabaugh |
| 6,233,511 | B1 | 5/2001 | Berger et al. | 7,089,099 B2 | 8/2006 | Shostak et al. |
| 6,236,916 | B1 | 5/2001 | Staub et al. | 7,142,956 B2 | 11/2006 | Heiniger et al. |
| 6,236,924 | B1 | 5/2001 | Motz | 7,162,348 B2 | 1/2007 | McClure et al. |
| 6,253,160 | B1 | 6/2001 | Hanseder | 7,191,061 B2 | 3/2007 | McKay et al. |
| 6,256,583 | B1 | 7/2001 | Sutton | 7,231,290 B2 | 6/2007 | Steichen et al. |
| 6,259,398 | B1 | 7/2001 | Riley | 7,248,211 B2 | 7/2007 | Hatch et al. |
| 6,266,595 | B1 | 7/2001 | Greatline et al. | 7,271,766 B2 | 9/2007 | Zimmerman et al. |
| 6,285,320 | B1 | 9/2001 | Olster et al. | 7,277,784 B2 | 10/2007 | Weiss |
| 6,292,132 | B1 | 9/2001 | Wilson | 7,292,186 B2 | 11/2007 | Miller et al. |
| 6,307,505 | B1 | 10/2001 | Green | 7,324,915 B2 | 1/2008 | Altman |
| 6,313,788 | B1 | 11/2001 | Wilson | 7,358,896 B2 | 4/2008 | Gradincic et al. |
| 6,314,348 | B1 | 11/2001 | Winslow | 7,373,231 B2 | 5/2008 | McClure et al. |
| 6,325,684 | B1 | 12/2001 | Knight | 7,388,539 B2 | 6/2008 | Whitehead et al. |
| 6,336,066 | B1 | 1/2002 | Pellenc et al. | 7,395,769 B2 | 7/2008 | Jensen |
| 6,345,231 | B2 | 2/2002 | Quincke | 7,428,259 B2 | 9/2008 | Wang et al. |
| 6,356,602 | B1 | 3/2002 | Rodal et al. | 7,437,230 B2 | 10/2008 | McClure et al. |
| 6,377,889 | B1 | 4/2002 | Soest | 7,451,030 B2 | 11/2008 | Eglington et al. |
| 6,380,888 | B1 | 4/2002 | Kucik | 7,479,900 B2 | 1/2009 | Horstemeyer |
| 6,389,345 | B2 | 5/2002 | Phelps | 7,505,848 B2 | 3/2009 | Flann et al. |
| 6,392,589 | B1 | 5/2002 | Rogers et al. | 7,522,100 B2 | 4/2009 | Yang et al. |
| 6,397,147 | B1 | 5/2002 | Whitehead | 7,571,029 B2 | 8/2009 | Dai et al. |
| 6,415,229 | B1 | 7/2002 | Diekhans | 7,689,354 B2 | 3/2010 | Heiniger et al. |
| 6,418,031 | B1 | 7/2002 | Archambeault | 2002/0165648 A1* | 11/2002 | Zeitler ............... 701/23 |
| 6,421,003 | B1 | 7/2002 | Riley et al. | 2003/0014171 A1 | 1/2003 | Ma et al. |
| 6,424,915 | B1 | 7/2002 | Fukuda et al. | 2003/0187560 A1 | 10/2003 | Keller et al. |
| 6,431,576 | B1 | 8/2002 | Viaud et al. | 2003/0208319 A1 | 11/2003 | Ell et al. |
| 6,434,462 | B1 | 8/2002 | Bevly et al. | 2004/0039514 A1 | 2/2004 | Steichen et al. |
| 6,445,983 | B1 | 9/2002 | Dickson et al. | 2004/0212533 A1 | 10/2004 | Whitehead |
| 6,445,990 | B1 | 9/2002 | Manring | 2005/0080559 A1 | 4/2005 | Ishibashi et al. |
| 6,449,558 | B1 | 9/2002 | Small | 2005/0225955 A1 | 10/2005 | Grebenkemper et al. |
| 6,463,091 | B1 | 10/2002 | Zhodzicshsky et al. | 2005/0265494 A1 | 12/2005 | Goodlings |
| 6,463,374 | B1 | 10/2002 | Keller et al. | 2006/0167600 A1 | 7/2006 | Nelson et al. |
| 6,466,871 | B1 | 10/2002 | Reisman et al. | 2006/0206246 A1 | 9/2006 | Walker |
| 6,469,663 | B1 | 10/2002 | Whitehead et al. | 2006/0215739 A1 | 9/2006 | Williamson et al. |
| 6,484,097 | B2 | 11/2002 | Fuchs et al. | 2007/0078570 A1 | 4/2007 | Dai et al. |
| 6,501,422 | B1 | 12/2002 | Nichols | 2007/0088447 A1 | 4/2007 | Stothert et al. |
| 6,515,619 | B1 | 2/2003 | McKay, Jr. | 2007/0121708 A1 | 5/2007 | Simpson |
| 6,516,271 | B2 | 2/2003 | Upadhyaya et al. | 2007/0205940 A1 | 9/2007 | Yang et al. |
| 6,539,303 | B2 | 3/2003 | McClure et al. | 2007/0285308 A1 | 12/2007 | Bauregger et al. |
| 6,542,077 | B2 | 4/2003 | Joao | 2008/0129586 A1 | 6/2008 | Martin |
| 6,549,835 | B2 | 4/2003 | Deguchi et al. | 2008/0204312 A1 | 8/2008 | Euler |
| 6,553,299 | B1 | 4/2003 | Keller et al. | 2009/0171583 A1 | 7/2009 | DiEsposti |
| 6,553,300 | B2 | 4/2003 | Ma et al. | 2009/0174597 A1 | 7/2009 | DiLellio et al. |
| 6,553,311 | B2 | 4/2003 | Ahearn et al. | 2009/0174622 A1 | 7/2009 | Kanou |
| 6,570,534 | B2 | 5/2003 | Cohen et al. | 2009/0177395 A1 | 7/2009 | Stelpstra |
| 6,577,952 | B2 | 6/2003 | Geier et al. | 2009/0177399 A1 | 7/2009 | Park et al. |
| 6,587,761 | B2 | 7/2003 | Kumar | 2009/0259397 A1 | 10/2009 | Stanton |
| 6,606,542 | B2 | 8/2003 | Hauwiller et al. | 2009/0259707 A1 | 10/2009 | Martin et al. |
| 6,611,228 | B2 | 8/2003 | Toda et al. | 2009/0262014 A1 | 10/2009 | DiEsposti |
| 6,611,754 | B2 | 8/2003 | Klein | 2009/0262018 A1 | 10/2009 | Vasilyev et al. |
| 6,611,755 | B1 | 8/2003 | Coffee et al. | 2009/0262974 A1 | 10/2009 | Lithopoulos |
| 6,622,091 | B2 | 9/2003 | Perlmutter et al. | 2009/0265054 A1 | 10/2009 | Basnayake |
| 6,631,916 | B1 | 10/2003 | Miller | 2009/0265101 A1 | 10/2009 | Jow |
| 6,643,576 | B1 | 11/2003 | O'Connor et al. | 2009/0265104 A1 | 10/2009 | Shroff |
| 6,646,603 | B2 | 11/2003 | Dooley | 2009/0265308 A1 | 10/2009 | Brown |
| 6,657,875 | B1 | 12/2003 | Zeng et al. | 2009/0273372 A1 | 11/2009 | Brenner |
| 6,671,587 | B2 | 12/2003 | Hrovat et al. | 2009/0273513 A1 | 11/2009 | Huang |
| 6,688,403 | B2 | 2/2004 | Bernhardt et al. | 2009/0274079 A1 | 11/2009 | Bhatia et al. |

| | | |
|---|---|---|
| 2009/0274113 A1 | 11/2009 | Katz |
| 2009/0276155 A1 | 11/2009 | Jeerage et al. |
| 2009/0295633 A1 | 12/2009 | Pinto et al. |
| 2009/0295634 A1 | 12/2009 | Yu et al. |
| 2009/0299550 A1 | 12/2009 | Baker |
| 2009/0322597 A1 | 12/2009 | Medina Herrero et al. |
| 2009/0322598 A1 | 12/2009 | Fly et al. |
| 2009/0322600 A1 | 12/2009 | Whitehead et al. |
| 2009/0322601 A1 | 12/2009 | Ladd et al. |
| 2009/0322606 A1 | 12/2009 | Gronemeyer |
| 2009/0326809 A1 | 12/2009 | Colley et al. |
| 2010/0013703 A1 | 1/2010 | Tekawy et al. |
| 2010/0026569 A1 | 2/2010 | Amidi |
| 2010/0030470 A1 | 2/2010 | Wang et al. |
| 2010/0039316 A1 | 2/2010 | Gronemeyer et al. |
| 2010/0039318 A1 | 2/2010 | Kmiecik |
| 2010/0039320 A1 | 2/2010 | Boyer et al. |
| 2010/0039321 A1 | 2/2010 | Abraham |
| 2010/0060518 A1 | 3/2010 | Bar-Sever et al. |
| 2010/0063649 A1 | 3/2010 | Wu |
| 2010/0084147 A1 | 4/2010 | Aral |
| 2010/0085249 A1 | 4/2010 | Ferguson et al. |
| 2010/0085253 A1 | 4/2010 | Ferguson et al. |
| 2010/0103033 A1 | 4/2010 | Roh |
| 2010/0103034 A1 | 4/2010 | Tobe et al. |
| 2010/0103038 A1 | 4/2010 | Yeh et al. |
| 2010/0103040 A1 | 4/2010 | Broadbent |
| 2010/0106414 A1 | 4/2010 | Whitehead |
| 2010/0106445 A1 | 4/2010 | Kondoh |
| 2010/0109944 A1 | 5/2010 | Whitehead et al. |
| 2010/0109945 A1 | 5/2010 | Roh |
| 2010/0109947 A1 | 5/2010 | Rintanen |
| 2010/0109948 A1 | 5/2010 | Razoumov et al. |
| 2010/0109950 A1 | 5/2010 | Roh |
| 2010/0111372 A1 | 5/2010 | Zheng et al. |
| 2010/0114483 A1 | 5/2010 | Heo et al. |
| 2010/0117894 A1 | 5/2010 | Velde et al. |
| 2010/0117899 A1 | 5/2010 | Papadimitratos et al. |
| 2010/0117900 A1 | 5/2010 | van Diggelen et al. |
| 2010/0124210 A1 | 5/2010 | Lo |
| 2010/0124212 A1 | 5/2010 | Lo |
| 2010/0134354 A1 | 6/2010 | Lennen |
| 2010/0149025 A1 | 6/2010 | Meyers et al. |
| 2010/0149030 A1 | 6/2010 | Verma et al. |
| 2010/0149033 A1 | 6/2010 | Abraham |
| 2010/0149034 A1 | 6/2010 | Chen |
| 2010/0149037 A1 | 6/2010 | Cho |
| 2010/0150284 A1 | 6/2010 | Fielder et al. |
| 2010/0152949 A1 | 6/2010 | Nunan et al. |
| 2010/0156709 A1 | 6/2010 | Zhang et al. |
| 2010/0156712 A1 | 6/2010 | Pisz et al. |
| 2010/0156718 A1 | 6/2010 | Chen |
| 2010/0159943 A1 | 6/2010 | Salmon |
| 2010/0161179 A1 | 6/2010 | McClure et al. |
| 2010/0161211 A1 | 6/2010 | Chang |
| 2010/0161568 A1 | 6/2010 | Xiao |
| 2010/0171660 A1 | 7/2010 | Shyr et al. |
| 2010/0171757 A1 | 7/2010 | Melamed |
| 2010/0185364 A1 | 7/2010 | McClure |
| 2010/0185366 A1 | 7/2010 | Heiniger et al. |
| 2010/0185389 A1 | 7/2010 | Woodard |
| 2010/0188285 A1 | 7/2010 | Collins |
| 2010/0188286 A1 | 7/2010 | Bickerstaff et al. |
| 2010/0189163 A1 | 7/2010 | Burgi et al. |
| 2010/0207811 A1 | 8/2010 | Lackey |
| 2010/0210206 A1 | 8/2010 | Young |
| 2010/0211248 A1 | 8/2010 | Craig et al. |
| 2010/0211315 A1 | 8/2010 | Toda |
| 2010/0211316 A1 | 8/2010 | DaSilva et al. |
| 2010/0220008 A1 | 9/2010 | Conover et al. |
| 2010/0222076 A1 | 9/2010 | Poon et al. |
| 2010/0225537 A1 | 9/2010 | Abraham |
| 2010/0228408 A1 | 9/2010 | Ford |
| 2010/0228480 A1 | 9/2010 | Lithgow et al. |

FOREIGN PATENT DOCUMENTS

| | | |
|---|---|---|
| WO | WO9836288 | 8/1998 |
| WO | WO0024239 | 5/2000 |
| WO | WO03019430 | 3/2003 |
| WO | WO2005/119386 | 12/2005 |
| WO | WO 2009/066183 | 5/2009 |
| WO | WO2009126587 | 10/2009 |
| WO | WO 2009/148638 | 12/2009 |

OTHER PUBLICATIONS

"Orthman Manufacturing Co., www.orthman.com/htm;guidance.htm", 2004, regarding the "Tracer Quick-Hitch".

Lin, Dai et al., "Real-time Attitude Determination fro Microsatellite by Lamda Method Combined with Kalman Filtering" *A Collection fof the 22nd AIAA International Communications Satellite Systems Conference and Exhibit Technical Paers vol. 1*, Monetrey, California American Institute of Aeronautics and Astronautics, Inc., (May 2004),136-143.

Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware (EH'02)*, (2002).

Han, Shaowel et al., "Single-Epoch Ambiguity Resolution for Real-Time GPS Attitude Determination with the Aid of One-Dimensional Optical Fiber Gyro" *GPS Solutions*, vol. 3, No. 1, pp. 5-12 (1999) John Wiley & Sons, Inc.

Park, Chansik et al., "Integer Ambiguity Resolution for GPS Based Attitude Determination System", *SICE*, Jul. 29-31, 1998, Chiba, 1115-1120.

Last, J. D., et al., "Effect of skywave interference on coverage of radiobeacon DGPS Stations", *IEEE Proc.-Radar. Sonar Navig.*, vol. 144, No. 3, Jun. 1997, pp. 163-168.

"International Search Report and Written Opinion", PCT/US2004/015678, filed May 17, 2004, Jun. 21, 2005.

"ISO" 11783 Part 7 Draft Amendment 1 Annex, Paragraphs B.6 and B.7.ISO 11783-7 2004 DAM1, ISO: Mar. 8, 2004.

Kaplan, E D., "Understanding GPS: Principles and Applications", *Artech House*, MA, 1996.

Irsigler, M et al., "PPL Tracking Performance in the Presence of Oscillator Phase Noise" *GPS Solutions*, vol. 5, No. 4, pp. 45-57 (2002).

Ward, Phillip W., "Performance Comparisons Between FLL, PLL and a Novel FLL-Assisted-PLL Carrier Tracking Loop Under RF Interference Conditions" *11th Int. Tech Meeting of the Satellite Division of the U.S. Inst. of Navigation*, Nashville, TN, Sep. 15-18, 1998, 783-795.

Bevly, David M., "Comparison of INS v. Carrier-Phase DGPS for Attitude Determination in the Control of Off-Road Vehicles", *ION 55th Annual Meeting*; Jun. 28-30, 1999; Cambridge, Massachusetts; pp. 497-504.

Keicher, R. et al., "Automatic Guidance for Agricultural Vehicles in Europe", *Computers and Electronics in Agriculture*, vol. 25, (Jan. 2000),169-194.

"International Search Report", PCT/US09/49776, (Aug. 11, 2009).

"International Search Report", PCT/AU/2008/000002, (Feb. 28, 2008).

"International Search Report", PCT/US09/33693, (Mar. 30, 2009).

"International Search Report", PCT/US09/039686, (May 26, 2009).

"International Search Report,", PCT/US09/34376, (Nov. 2, 2009).

"International Search Report", PCT/US09/33567, (Feb. 9, 2009).

"International Search Report and Written Opinion", PCT/IB2008/003796, (Jul. 15, 2009).

"International Search Report", PCT/US09/067693, (Jan. 26, 2010).

"International Search Report and Written Opinion", PCT/US10/21334, (Mar. 12, 2010).

Rho, Hyundho et al., "Dual-Frequency GPS Precise Point Positioning with WADGPS Corrections", [retrieved on May 18, 2010]. Retrieved from the Internet: ,URL: http://gauss.gge.unb.ca/papers.pdf/iongnss2005.rho.wadgps.pdf, (Jul. 12, 2006).

"EUROCONTROL, PEGASUS Technical Notes on SBAS", report [online], Dec. 7, 2004 [retrieved on May 18, 2010]. Retrieved from the Internet: http://www.icao.int/icao/en/ro/nacc/rneetings/2004/gnss/documentation/Pegasus/tn.pdf>, (Dec. 7, 2004), p. 89 paras [0001]-[0004].

"ARINC Engineering Services, Interface Specification IS-GPS-200, Revision D", Online [retrieved on May 18, 2010]. Retrieved from the Internet;<URL: http://www.navcen.uscg.gov/gps/geninfo/IS-GPS-200D.pdf>, (Dec. 7, 2004), p. 168 para [0001].

Schaer, et al., "Determination and Use of GPS Differential Code Bias Values", Presentation [online]. Revtrieved May 18, 2010. Retrieved from the Internet: <http://nng.esoc.esa.de/ws2006/REPR2.pdf>, (May 8, 2006).

"International Search Report", PCT/US10/26509, (Apr. 20, 2010).

"International Search Report and Written Opinion", International Searching Authortiy, PCT/US08/88070, Feb. 9, 2009.

Takac, Frank et al., "SmartRTK: A Novel Method of Processing Standardised RTCM Network RTK Information for High Precision Positioning", *Proceedings of ENC GNSS 2008*, Toulouse, France, (Apr. 22, 2008).

"International Search Report / Written Opinion", PCT/US09/63594, (Jan. 11, 2010).

"International Search Report", PCT/US09/60668, (Dec. 9, 2009).

* cited by examiner

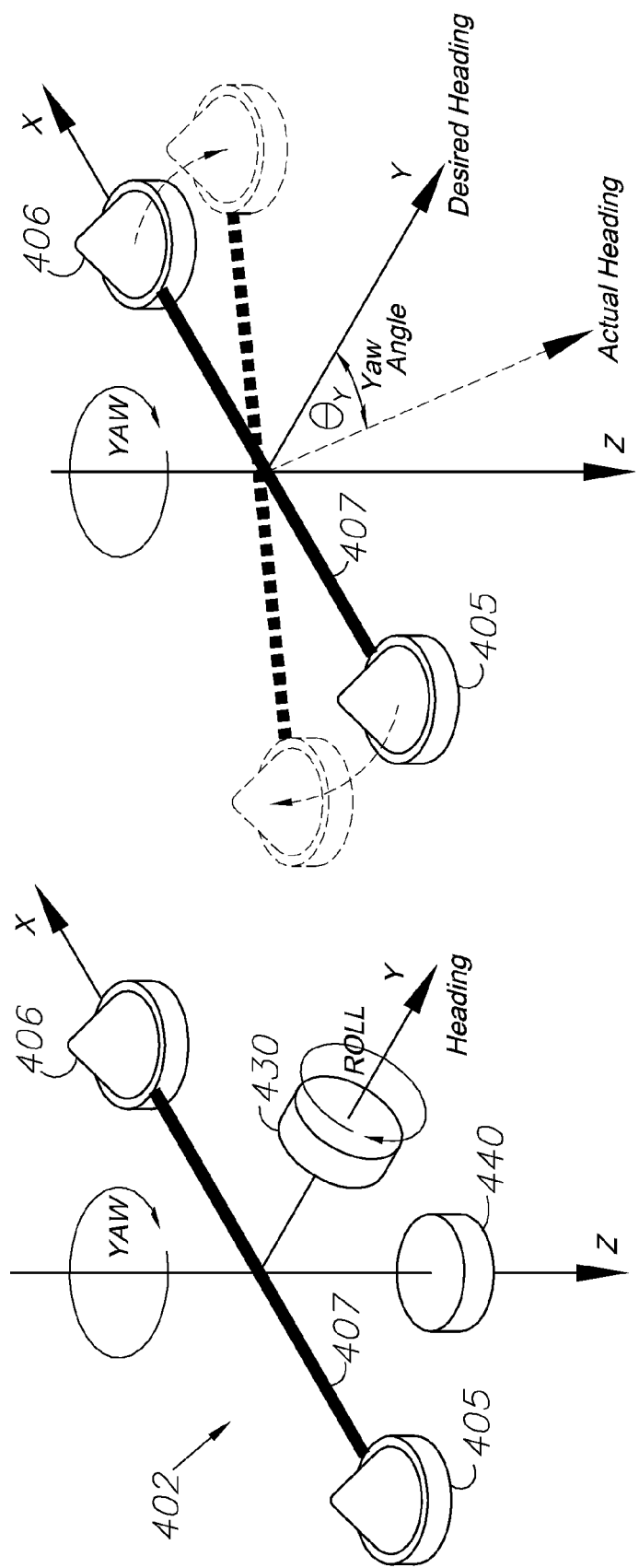

Tilt (Roll) Attitude

COMBINED GNSS GYROSCOPE CONTROL SYSTEM AND METHOD

CROSS-REFERENCE TO RELATED APPLICATIONS

This application is a continuation-in-part of and claims the benefit of: U.S. patent applications No. 10/804,758, filed Mar. 19, 2004, now U.S. Pat. No. 7,400,956, and No. 10/828,745, filed Apr. 21, 2004 now abandoned; and U.S. Provisional Patent Applications No. 60/456,146, filed Mar. 20, 2003 and No. 60/464,756, filed Apr. 23, 2003. The contents of all of the aforementioned applications are incorporated by reference herein in their entireties.

BACKGROUND OF THE INVENTION

The invention relates generally to automatic guidance systems and more specifically to a global navigation satellite system (GNSS) based sensor for vehicle steering control.

Movable machinery, such as agricultural equipment, open-pit mining machines, airplane crop dusters and the like all benefit from accurate global navigation satellite system (GNSS) high precision survey products, and others. However, in existing satellite positioning systems (SATPS) for guided parallel and contour swathing for precision farming, mining, and the like, the actual curvature of terrain may not be taken into account. This results in a less than precise production because of the less than precise parallel or contour swathing. Indeed, in order to provide swaths through a field (in farming, for example), the guidance system collects positions of the vehicle as it moves across the field. When the vehicle commences the next pass through the field, the guidance system offsets the collected positions for the previous pass by the width of the equipment (i.e. swath width). The next set of swath positions is used to provide guidance to the operator as he or she drives the vehicle through the field.

The current vehicle location, as compared to the desired swath location, is provided to the vehicle's operator or to a vehicle's steering system. The SATPS provides the 3-D location of signal reception (for instance, the 3-D location of the antenna). If only 3-D coordinates are collected, the next swath computations assume a flat terrain offset. However, the position of interest is often not the same as where the satellite receiver (SR) is located since the SR is placed in the location for good signal reception, for example, for a tractor towing an implement, the best location for the SR may be on top of the cab. However, the position of interest (POI) for providing guidance to the tractor operator may be the position on the ground below the operator. If the tractor is on flat terrain, determining this POI is a simple adjustment to account for the antenna height.

However, if the tractor is on an inclined terrain with a variable tilt, which is often the case, the SATPS alone cannot determine the terrain tilt so the POI also cannot be determined. This results in a guidance error because the POI is approximated by the point of reception (POR), and this approximation worsens as the terrain inclination increases. This results in cross track position excursions relative to the vehicle ground track which would contaminate any attempt to guide to a defined field line or swath. On inclined terrain, this error can be minimized by collecting the vehicle tilt configuration along each current pass or the previous pass. The swath offset thus becomes a vector taking the terrain inclination into account with the assumption that from the first swath to the next one the terrain inclination does not change too much. It can therefore be seen that there is a need for a better navigation/guidance system for use with a ground-based vehicle that measures and takes into account vehicle tilt.

Various navigation systems for ground-based vehicles have been employed but each includes particular disadvantages. Systems using Doppler radar will encounter errors with the radar and latency. Similarly, gyroscopes, which may provide heading, roll, or pitch measurements, may be deployed as part of an inertial navigation package, but tend to encounter drift errors and biases and still require some external attitude measurements for gyroscope initialization and drift compensation. Gyroscopes have good short-term characteristics but undesirable long-term characteristics, especially those gyro copes of lower cost such as those based on a vibrating resonator. Similarly, inertial systems employing gyroscopes and accelerometers have good short-term characteristics but also) suffer from drift. Various systems include navigating utilizing GNSS; however, these systems also exhibit disadvantages. Existing GNSS position computations may include lag times, which may be especially troublesome when, for example, GNSS velocity is used to derive vehicle heading. As a result, the position (or heading) solution provided by a GNSS receiver tells a user where the vehicle was a moment ago, but not in real time. Existing GNSS systems do not provide high quality heading information at slower vehicle speeds. Therefore, what is needed is a low cost sensor system to facilitate vehicle swath navigation that makes use of the desirable behavior of both GNSS and inertial units while eliminating or reducing non-desirable behavior. Specifically, what is needed is a means to employ low-cost gyroscopes (e.g., micro electromechanical (MEM) gyroscopes) which exhibit very good short-term low noise and high accuracy while removing their inherent long-term drift.

BRIEF SUMMARY OF THE INVENTION

Disclosed herein in an exemplary embodiment is a sensor system for vehicle steering control comprising: a plurality of global navigator satellite systems (GNSS) including receivers and antennas at a fixed spacing to determine a vehicle position, velocity and at least one of a heading angle, a pitch angle and a roll angle based on carrier phase corrected real time kinematic (RTK) position differences. The roll angle facilitates correction of the lateral motion induced position errors resultant from motion of the antennae as the vehicle moves based on an offset to ground and the roll angle. The system also includes a control system configured to receive the vehicle position, heading, and at least one of roll, pitch and yaw, and configured to generate a steering command to a vehicle steering system.

Also disclosed herein in another exemplary embodiment is a method for computing a position of a vehicle comprising: initializing GNSS; computing a first position of a first GNSS antenna on the vehicle; computing a second position of a second GNSS antenna; and calculating a heading as a vector perpendicular to a vector joining the first position and the second position, in a horizontal plane aligned with the vehicle. The method also includes computing a roll angle of the vehicle as an arc-tangent of a ratio of differences in heights of the first GNSS antenna and the second GNSS antenna divided by a spacing between their respective phase centers and calculating an actual position at the center of the vehicle projected to the ground using the computed roll angle and a known height from the ground of at least one of the first GNSS antenna and the second GNSS antenna.

Further disclosed herein in yet another exemplary embodiment is a method of controlling a vehicle comprising: computing a position and a heading for the vehicle; computing a steering control command based on a proportionality factor multiplied by a difference in a desired position versus an actual position, plus a second proportionality factor multiplied by a difference in a desired heading versus an actual heading, the second proportionality factor ensuring that when the vehicle attains the desired position the vehicle is also directed to the desired heading, and thereby avoiding crossing a desired track. The method also includes a recursive adaptive algorithm employed to characterize the vehicle response and selected dynamic characteristics.

The method further includes applying selected control values to a vehicle steering control mechanism and measuring responses of the vehicle thereto; calculating response times and characteristics for the vehicle based on the responses; and calibrating the control commands by applying a modified control command based on the responses to achieve a desired response. Various alternative aspects and applications of the present invention are disclosed herein.

BRIEF DESCRIPTION OF THE DRAWINGS

FIG. 7A depicts a multi-axis antenna and gyroscope system embodying an aspect of the present invention and including two antennas connected by a rigid link and yaw and roll gyroscopes;

FIG. 7B depicts the system in a yaw attitude;

DETAILED DESCRIPTION OF THE PREFERRED ASPECTS

Figure 1:
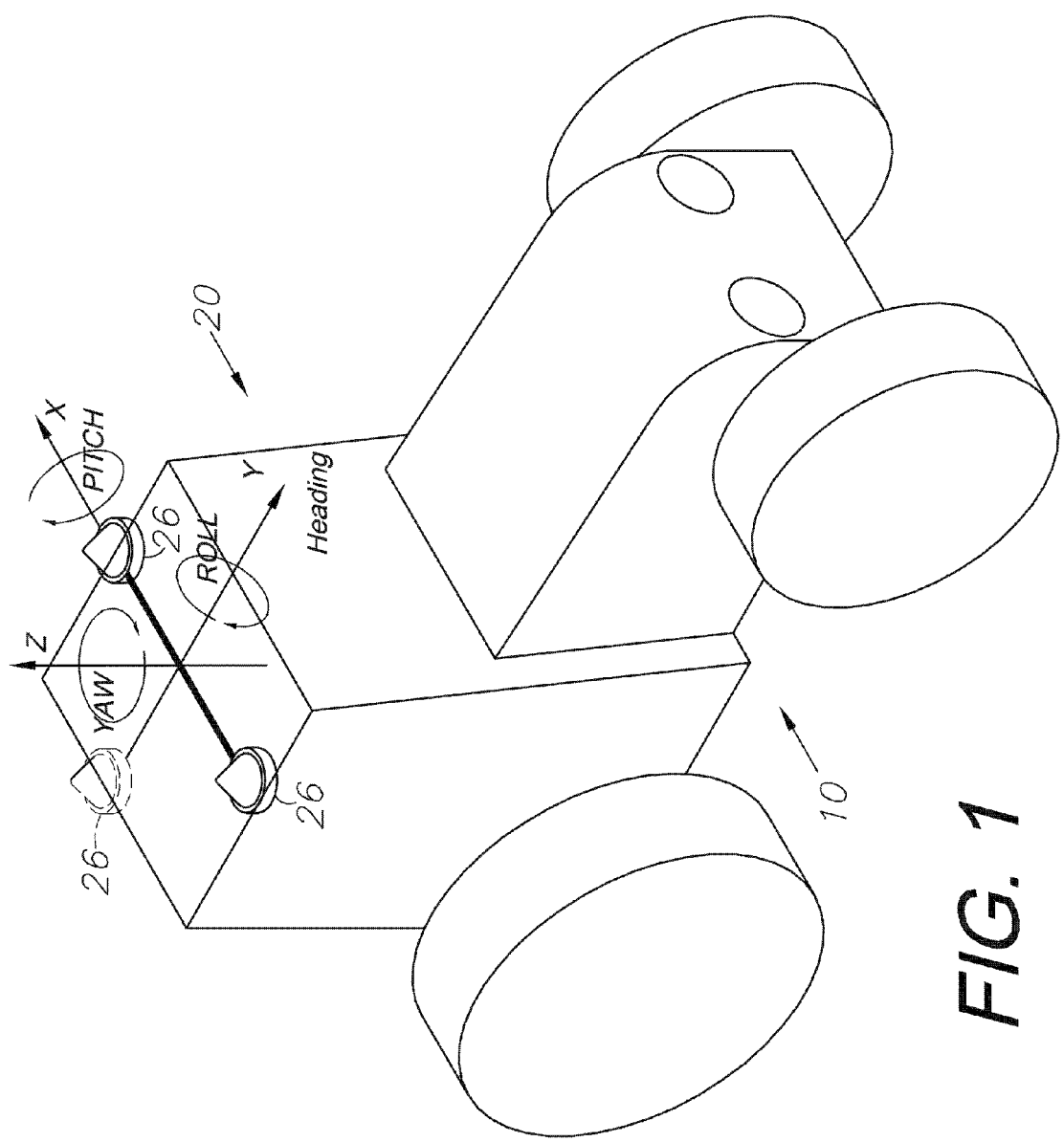
FIG. 1 depicts an illustrative diagram of a vehicle including an exemplary embodiment.

Global navigation satellite systems (GNSS) are broadly defined to include GPS (U.S.), Galileo (proposed), GLONASS (Russia), Beidou/Compass (China, proposed), IRNSS (India, proposed), QZSS (Japan, proposed) and other current and future positioning technology using signals from satellites, with or without augmentation from terrestrial sources. Inertial navigation systems (INS) include gyroscopic (gyro) sensors, accelerometers and similar technologies for providing output corresponding to the inertia of moving components in all axes, i.e. through six degrees of freedom (positive and negative directions along transverse X, longitudinal Y and vertical Z axes). Yaw, pitch and roll refer to moving component rotation about the Z, X and Y axes respectively.

Said terminology will include the words specifically mentioned, derivatives thereof and words of similar meaning.

Disclosed herein in an exemplary embodiment is a sensor system for vehicle guidance. The sensor system utilizes a plurality of GNSS carrier phase differenced antennas to derive attitude information, herein referred to as a GNSS attitude system. Moreover, the GNSS attitude system may optionally be combined with one or more rate gyro(s) used to measure turn, roll or pitch rates and to further calibrate bias and scale factor errors within these gyros. In an exemplary embodiment, the rate gyros and GNSS receiver/antenna are integrated together within the same unit, to provide multiple mechanisms to characterize a vehicle's motion and position to make a robust vehicle steering control mechanism.

It is known in the art that by using a GNSS satellite's carrier phase, and possibly carrier phases from other satellites, such as WAAS satellites, a position may readily be determined to within millimeters. When accomplished with two antennas at a fixed spacing, an angular rotation may be computed using the position differences. In an exemplary embodiment, two antennas placed in the horizontal plane may be employed to compute a heading (rotation about a vertical Z axis) from a position displacement. It will be appreciated that an exemplary embodiment may be utilized to compute not only heading, but either roll (rotation about a longitudinal Y axis) or pitch (rotation about a lateral X axis) depending on the orientation of the antennas relative to the vehicle. Heading information, combined with position, either differentially corrected (DGPS or DGNSS) or carrier phase corrected real time kinematic (RTK) provides the feedback information desired for a proper control of the vehicle direction. Addition of one or more rate gyros further provides independent measurements of the vehicle's dynamics and facilitates vehicle steering control. The combination of GNSS attitude obtained from multiple antennas with gyroscopes facilitates calibration of gyroscope scale factor and bias errors which are present in low cost gyroscopes. When these errors are removed, gyro rates are more accurate and provide better inputs for guidance and control. Furthermore, gyroscopes can now effectively be integrated to obtain roll, pitch and heading angles with occasional adjustment from the GNSS-derived attitude.

Existing systems for vehicle guidance may employ separate gyros, and separate GNSS positioning or attitude systems. However, such systems do not provide an integrated heading sensor based on GNSS as disclosed herein. Moreover, separate systems exhibit the limitations of their respective technologies as mentioned earlier. The exemplary embodiments as described herein eliminate the requirements of existing systems for other means to correct for vehicle roll. Moreover, an implementation of an exemplary embodiment also provides a relatively precise, in both the short-term and the long-term, means of calculating heading and heading rate of change (turn rate).

Another benefit achieved by incorporating a GNSS-based heading sensor is the elimination or reduction of drift and biases resultant from a gyro-only or other inertial sensor approach. Yet another advantage is that heading may be computed while the vehicle is stopped or moving slowly, which is not possible in a single-antenna GNSS based approach that requires a vehicle velocity vector to derive heading. This can be very important in applications where a vehicle has to turn slowly to align with another path. During these slow turns the gyro can drift away but by adding the use of a dual antenna GNSS solution the orientation of the gyro can be continuously corrected. This also permits immediate operation of a slow moving vehicle after being at rest, rather than requiring an initialization from motion. Yet another advantage of an exemplary embodiment is that a combination of the aforementioned sensors provides sufficient information for a feedback control system to be developed, which is standalone and independent of a vehicle's sensors or additional external sensors. Thus, such a system is readily maintained as vehicle-independent and may be moved from one vehicle to another with minimal effort. Yet another exemplary embodiment of the sensor employs global navigation satellite system (GNSS) sensors and measurements to provide accurate, reliable positioning information. GNSS sensors include, but are not limited to GNSS, Global Navigation System (GLONAS), Wide Area Augmentation System (WAAS) and the like, as well as combinations including at least one of the foregoing.

An example of a GNSS is the Global Positioning System (GPS) established by the United States government that employs a constellation of 24 or more satellites in well-defined orbits at an altitude of approximately 26,500 km. These satellites continually transmit microwave L-band radio signals in two frequency bands, centered at 1575.42 MHz and 1227.6 MHz., denoted as L1 and L2 respectively. These signals include timing patterns relative to the satellite's onboard precision clock (which is kept synchronized by a ground station) as well as a navigation message giving the precise orbital positions of the satellites, an ionosphere model and other useful information. GNSS receivers process the radio signals, computing ranges to the GNSS satellites, and by triangulating these ranges, the GNSS receiver determines its position and its internal clock error.

In standalone GNSS systems that determine a receiver's antenna position coordinates without reference to a nearby reference receiver, the process of position determination is subject to errors from a number of sources. These include errors in the GNSS satellite's clock reference, the location of the orbiting satellite, ionosphere induced propagation delay errors, and troposphere refraction errors.

To overcome the errors of the standalone GNSS system, many positioning applications have made use of data from multiple GNSS receivers. Typically, in such applications, a reference receiver, located at a reference site having known coordinates, receives the GNSS satellite signals simultaneously with the receipt of signals by a remote receiver. Depending on the separation distance between the two GNSS receivers, many of the errors mentioned above will affect the satellite signals equally for the two receivers. By taking the difference between signals received both at the reference site and the remote location, the errors are effectively eliminated. This facilitates an accurate determination of the remote receiver's coordinates relative to the reference receiver's coordinates.

The technique of differencing signals from two or more GNSS receivers to improve accuracy is known as differential GNSS (DGNSS or DGPS). Differential GNSS is well known and exhibits many forms. In all forms of DGNSS, the positions obtained by the end user's remote receiver are relative to the position(s) of the reference receiver(s). GNSS applications have been improved and enhanced by employing a broader array of satellites such as GNSS and WAAS. For example, see commonly assigned U.S. Pat. No. 6,469,663 B1 to Whitehead et al. titled Method and System for GNSS and WAAS Carrier Phase Measurements for Relative Positioning, dated Oct. 22, 2002, the disclosures of which are incorporated by reference herein in their entirety. Additionally, multiple receiver DGNSS has been enhanced by utilizing a single receiver to perform differential corrections. For example, see commonly assigned U.S. Pat. No. 6,397,147 B1 to Whitehead titled Relative GNSS Positioning Using a Single GNSS Receiver with Internally Generated Differential Correction Terms, dated May 28, 2002, the disclosures of which are incorporated by reference herein in their entirety.

Figure 2:
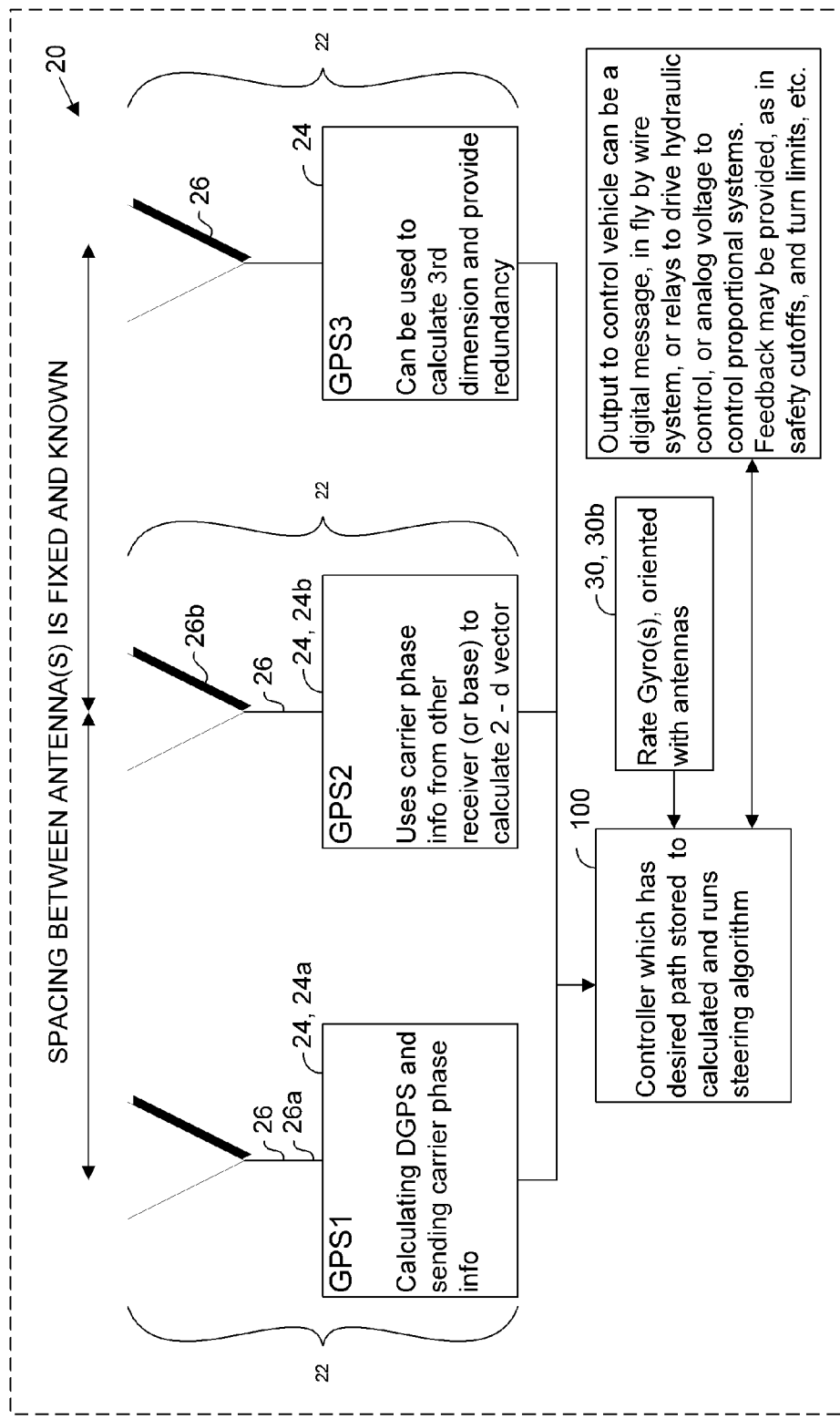
FIG. 2 depicts an illustrative block diagram of the vehicle including an exemplary embodiment of a sensor system.
Figure 3:
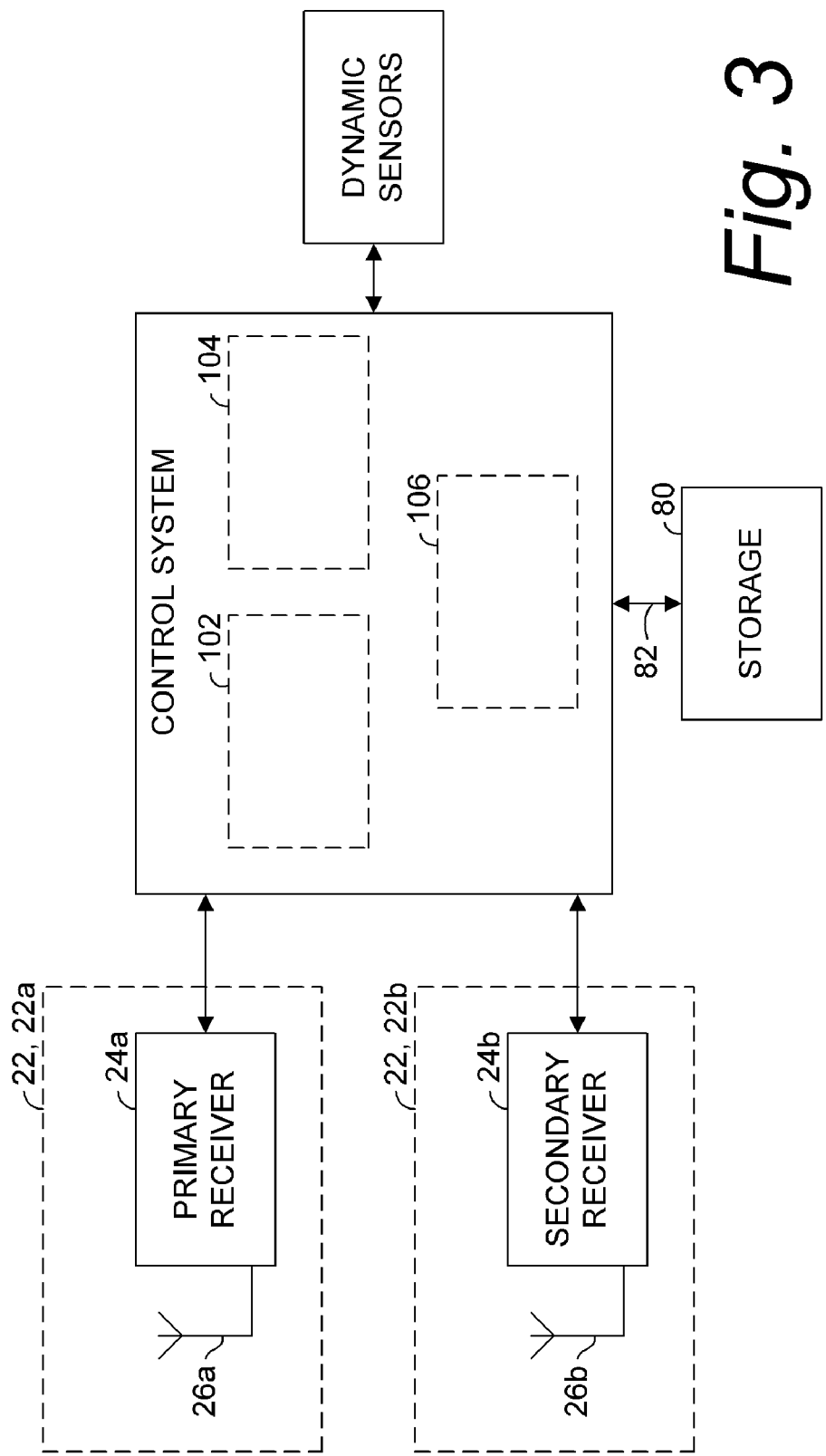
FIG. 3 depicts an illustrative block diagram of a sensor system in accordance with an exemplary embodiment.

Referring now to FIGS. 1 through 4, an illustrative vehicle 10 is depicted including a sensor system 20 in accordance with an exemplary embodiment. Referring also to FIGS. 2 and 3, block diagrams of the sensor system 20 are depicted. The sensor system 20 includes, but is not limited to a GNSS attitude system 22, comprising at least a GNSS receiver 24 and an antenna 26. The GNSS receiver/antenna systems comprising GNSS attitude system 22 cooperate as a primary receiver system 22a and a secondary receiver system 22b, with their respective antennas 26a and 26b mounted with a known separation. The primary receiver system 22a may also be denoted as a reference or master receiver system, while the secondary receiver system 22b may also be denoted as a remote or slave receiver system. It will also be appreciated that the selection of one receiver as primary versus secondary need not be of significance; it merely provides a means for distinguishing between systems, partitioning of functionality, and defining measurement references to facilitate description. It should be appreciated that the nomenclature could readily be transposed or modified without impacting the scope of the disclosure or the claims.

The sensor system 20 is optionally configured to be mounted within a single enclosure 28 to facilitate transportability. In an exemplary embodiment, the enclosure 28 can be any rigid assembly, fixture, or structure that causes the antennas 26 to be maintained in a substantially fixed relative position with respect to one another. In an exemplary embodiment, the enclosure 28 may be a lightweight bracket or structure to facilitate mounting of other components and transportability. Although the enclosure 28 that constrains the relative location of the two antennas 26a and 26b may have virtually any position and orientation in space, the two respective receivers 24 (reference receiver 24a and remote receiver 24b) are configured to facilitate communication with one another and resolve the attitude information from the phase center of the reference antenna 26a to the phase center of the remote antenna 26b with a high degree of accuracy.

Yet another embodiment employs a GNSS sensor 20 in the embodiments above augmented with supplementary inertial sensors 30 such as accelerometers, gyroscopes, or an attitude heading reference system. More particularly, in an implementation of an exemplary embodiment, one or more rate gyro(s) are integrated with the GNSS sensor 20.

In yet another exemplary embodiment, a gyro that measures roll-rate may also be combined with this system's GNSS-based roll determination. A roll rate gyro denoted 30b would provide improved short-term dynamic rate information to gain additional improvements when computing the sway of the vehicle 10, particularly when traveling over uneven terrain.

It will be appreciated that to supplement the embodiments disclosed herein, the data used by each GNSS receiver 24 may be coupled with data from supplementary sensors 50, including, but not limited to, accelerometers, gyroscopic sensors, compasses, magnetic sensors, inclinometers, and the like, as well as combinations including at least one of the foregoing. Coupling GNSS data with measurement information from supplementary sensors 30, and/or correction data for differential correction improves positioning accuracy, improves initialization durations and enhances the ability to recover for data outages. Moreover, such coupling may further improve, e.g., reduce, the length of time required to solve for accurate attitude data.

It will be appreciated that although not a requirement, the location of the reference antenna 26a can be considered a fixed distance from the remote antenna 26*b*. This constraint may be applied to the azimuth determination processes in order to reduce the time required to solve for accurate azimuth, even though both antennas 26*a* and 26*b* may be moving in space or not at a known location. The technique of resolving the attitude information and position information for the vehicle 10 may employ carrier phase DGNSS techniques with a moving reference station. Additionally, the use of data from auxiliary dynamic sensors aids the development of a heading solution by applying other constraints, including a rough indication of antenna orientation relative to the Earth's gravity field and/or alignment to the Earth's magnetic field.

Producing an accurate attitude from the use of two or more GNSS receiver and antenna systems 22 has been established in the art and therefore will not be expounded upon herein. The processing is utilized herein as part of the process required to implement an exemplary embodiment.

Figure 4:
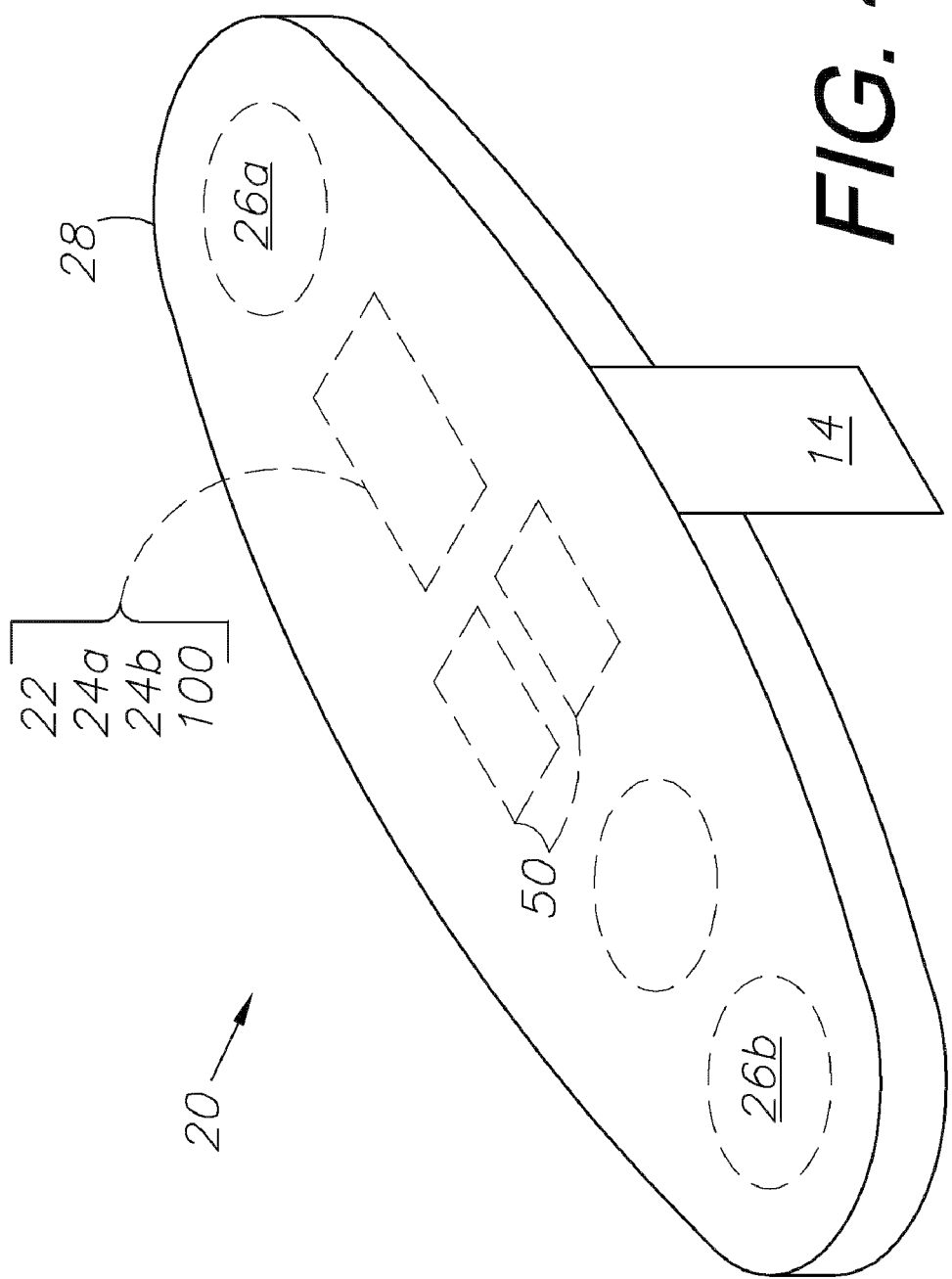
FIG. 4 depicts an illustrative sensor system in accordance with an exemplary embodiment.

Referring also to FIG. 4, a mechanism for ensuring an accurate orientation of the sensor system 20 to the vehicle 10 may be provided for by an optional mounting base 14 accurately attached to the enclosure 28. An accurate installation ensures that substantially no misalignment error is present that may otherwise cause the sensor system 20 to provide erroneous heading information. The mounting base 14 is configured such that it fits securely with a determinable orientation relative to the vehicle 10. In an exemplary embodiment, for example, the mounting base 14 is configured to fit flatly against the top surfaces of the vehicle 10 to facilitate an unimpeded view to the GNSS satellites.

With the sensor system 20 affixed and secured in the vehicle 10 power up and initialization of the sensor system 20 is thereafter executed. Such an initialization may include, but not be limited to, using the control system 100 to perform any initialization or configuration that may be necessary for a particular installation, including the configuration of an internal log file within the memory of the sensor system 20.

The sensor system 20 may further include additional associated electronics and hardware. For example, the sensor system 20 may also include a power source 32, e.g., battery, or other power generation means, e.g., photovoltaic cells, and ultrahigh capacity capacitors and the like. Moreover, the sensor system 20 may further include a control system 100. The control system 100 may include, without limitation, a controller/computer 102, a display 104 and an input device 106, such as a keypad or keyboard for operation of the control system 100. The controller 102 may include, without limitation, a computer or processor, logic, memory, storage, registers, timing, interrupts, input/output signal interfaces, and communication interfaces as required to perform the processing and operations prescribed herein. The controller preferably receives inputs from various systems and sensor elements of the sensor system 20 (GNSS, inertial, etc.), and generates output signals to control the same and direct the vehicle 10. For example, the controller 102 may receive such inputs as the GNSS satellite and receiver data and status, inertial system data, and the like from various sensors. In an exemplary embodiment, the control system 100 computes and outputs a cross-track and/or a direction error relating to the current orientation, attitude, and velocity of the vehicle 10 as well as computing a desired swath on the ground. The control system 100 will also allow the operator to configure the various settings of the sensor system 20 and monitor GNSS signal reception and any other sensors of the sensor system 20. In an exemplary embodiment, the sensor system 20 is self-contained. The control system 100, electronics, receivers 24, antennas 26, and any other sensors, including an optional power source, are contained within the enclosure 12 to facilitate ease of manipulation, transportability, and operation.

Figure 5:
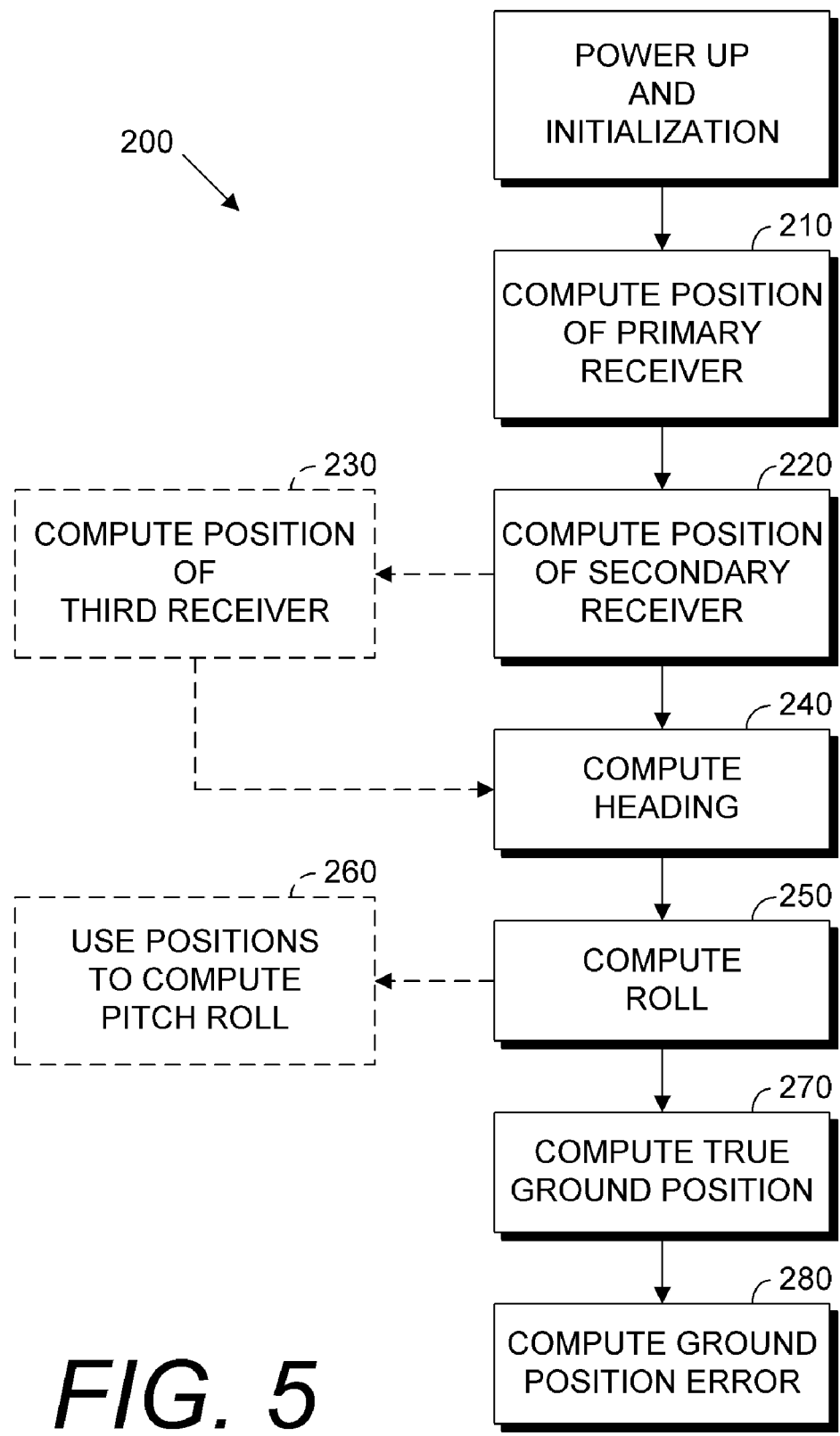
FIG. 5 depicts an illustrative flow chart of an exemplary process for determining a steering command for a vehicle in accordance with an exemplary embodiment.

Referring now to FIG. 5, a flowchart diagrammatically depicting an exemplary methodology for executing a control process 200 is provided. An exemplary control process 200, such as may be executed by an operator in conjunction with a control system 100, acts upon information from the sensor system 20 to output cross-track and/or direction error based upon corrected 3-D position, velocity, heading, tilt, heading rate (degrees per second), radius of curvature and the like.

System 22*a* computes its position, denoted $p_1(x_1, y_1, z_1)$. Referring now to block 220, the secondary receiver and antenna system 22*b* computes its position, denoted $p_2(x_2, y_2, z_2)$. Referring now to block 230, optionally additional receiver and antenna system(s) 22 compute their respective positions, denoted $p_3(x_3, y_3, z_3), \ldots p_n(x_n, y_n, z_n)$.

At process block 240, employing a geometric calculation the heading is computed as the vector perpendicular to the vector joining the two positions, in the horizontal plane (assuming they are aligned with the vehicle 10). Furthermore, at block 250 the roll of the vehicle 10 may readily be computed as the arc-tangent of the ratio of the difference in heights of the two antennas 26*a* and 26*b* divided by the spacing between n their phase centers (a selected distance within the enclosure 12). It will be appreciated that optionally, if additional receiver and antenna systems are utilized and configured for additional measurements, the pitch and roll angles may also be computed using differential positioning similar to the manner for computing heading. Therefore, in FIG. 5, optionally at process block 260, the pitch and roll may be computed.

Continuing with FIG. 5, at process block 270, using the computed roll angle and a known antenna height (based on the installation in a given vehicle 10), the actual position at the center of the vehicle 10 projected to the ground may be calculated. This position represents a true ground position of the vehicle 10. Once the ground position is known, the error value representing the difference between where the vehicle should be based on a computed swath or track, and where it actually is, can be readily calculated as shown at block 280.

Optionally, the vector velocities of the vehicle 10 are also known or readily computed based on an existing course and heading of the vehicle 10. These vector velocities may readily be utilized for control and instrumentation tasks.

Figure 6:
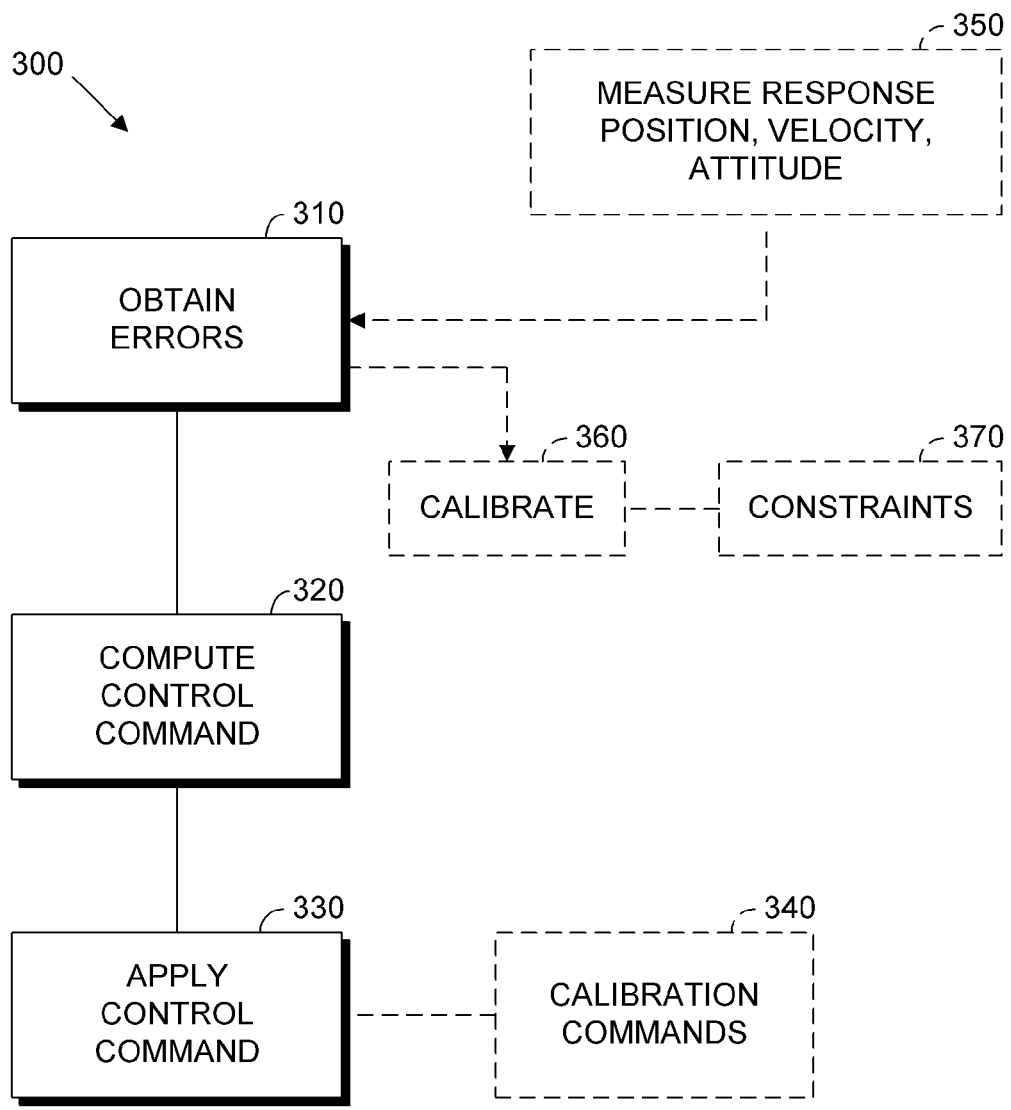
FIG. 6 depicts an illustrative flow chart of an exemplary process for determining a steering command with an exemplary sensor system in accordance with an alternative embodiment.

Turning now to FIG. 6, in another exemplary embodiment a steering control process 300 can utilize the abovementioned information from the sensor system 20 to direct the vehicle motion. At process block 310 the steering control may be initiated by obtaining the computed errors from process 200. Turning to block 320, the steering control process 300 may be facilitated by computing a steering control command based on a proportionality factor times the difference in desired position versus actual position (computed position error), plus a second proportionality factor times the difference in desired heading versus actual heading (heading error). The second proportionality factor ensures that when the vehicle attains the desired position it is actually directed to the correct heading, rather than crossing the track. Such an approach will dramatically improve steering response and stability. At process block 330, a steering command is generated and directed to the vehicle 10.

Moreover, continuing with FIG. 6, optionally a recursive adaptive algorithm may also be employed to characterize the vehicle response and selected dynamic characteristics. In an exemplary embodiment, the sensor system 20 applies selected control values to the vehicle steering control mechanism as depicted at optional block 340 and block 330. The sensor system 20 measures the response of the vehicle 10 as depicted at process block 350 and calculates the response times and characteristics for the vehicle. For example, a selected command is applied and the proportionality of the turn is measured given the selected change in steering. Turning to process block 360, the responses of the vehicle 10 are then utilized to calibrate the control commands applying a modified control command to achieve a desired response. It will be appreciated that such an auto-calibration feature would possibly be limited by constraints of the vehicle to avoid excess stress or damage as depicted at 370.

It will be appreciated that while a particular series of steps or procedures is described as part of the abovementioned alignment process, no order of steps should necessarily be inferred from the order of presentation. For example, the process 200 includes installation and power up or initialization. It should be evident that power-up and initialization could potentially be performed and executed in advance without impacting the methodology disclosed herein or the scope of the claims.

It should further be appreciated that while an exemplary partitioning functionality has been provided, it should be apparent to one skilled in the art that the partitioning could be different. For example, the control of the primary receiver 24a and the secondary receiver 24b, as well as the functions of the controller 102, could be integrated in other units. The processes for determining the alignment may, for ease of implementation, be integrated into a single receiver. Such configuration variances should be considered equivalent and within the scope of the disclosure and claims herein.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium 80 wherein the computer becomes an apparatus for practicing the invention when the computer program code is loaded into and executed by the computer. The present invention can also be embodied in the form of computer program code stored in a storage medium or loaded into and/or executed by a computer, for example. The present invention can also be embodied in the form of a data signal 82 transmitted by a modulated or unmodulated carrier wave, over a transmission medium, such as electrical wiring or cabling, through fiber optics or via electromagnetic radiation. When the computer program code is loaded into and executed by a computer, the computer becomes an apparatus for practicing the invention. When implemented on a general-purpose microprocessor, the computer program code segments configure the microprocessor to create specific logic circuits.

FIG. 7A shows another alternative aspect of the invention including a GNSS antenna and gyroscope attitude system 402 with antennas 405, 406 separated by a rigid link 407. In a typical application, the rigid link 407 is attached to the vehicle 10 and extends along the X (transverse) axis or transversely with respect to the vehicle's direction of travel, which generally corresponds to the Y (heading) axis. Alternatively, the vehicle 10 itself can provide the rigid link between the antennas 405, 406, for example, by mounting the antennas 405, 406 at predetermined, fixed locations on the roof of the vehicle cab with a predetermined, fixed distance therebetween. Another alternative is to provide a GNSS attitude device with antennas, receivers and sensors (e.g., gyroscopes (gyros), accelerometers and other sensors) in a self-contained, unitary enclosure, such as the device 20 shown in enclosure 28 in FIG. 4. Regardless of the antenna-mounting structure, the orientation of the antenna pair and the rigid link 407 (or vehicle 10) is determined with respect to an Earth-fixed coordinate system. The XYZ axes shown in FIG. 7A provide an example for defining this relation. Roll and yaw gyros 430, 440 are generally aligned with the Y and Z axes respectively for detecting and measuring vehicle 10 attitude changes with respect to these axes.

With the system 402 installed on a vehicle 10 (FIG. 8), the two antennas 405, 406 can provide angular orientations with respect to two axes. In the example shown, angular orientation with respect to the Y (heading) axis corresponds to vehicle roll and with respect to the Z (vertical) axis corresponds to vehicle yaw. These orientations are commonly of interest in agricultural vehicles whereby this is the preferred mounting and orientation arrangement for such applications. The vehicle's roll most adversely affects GNSS-measured vehicle cross-track error. By measuring the vehicle's roll, such cross-track errors can be compensated for or eliminated. Such roll-induced cross-track errors include variable roll errors due to uneven terrain and constant roll errors due to hill slopes. It will be appreciated that adding a third antenna provides three-axis (XYZ) attitude solutions corresponding to pitch, roll and yaw. Of course, reorienting the two-antenna system 402 can provide other attitude solutions. For example, locating the antennas' baseline (aligned with the rigid link 407) fore-and-aft along the vehicle's Y axis will provide pitch and yaw attitudes.

Figures 7C, 8:
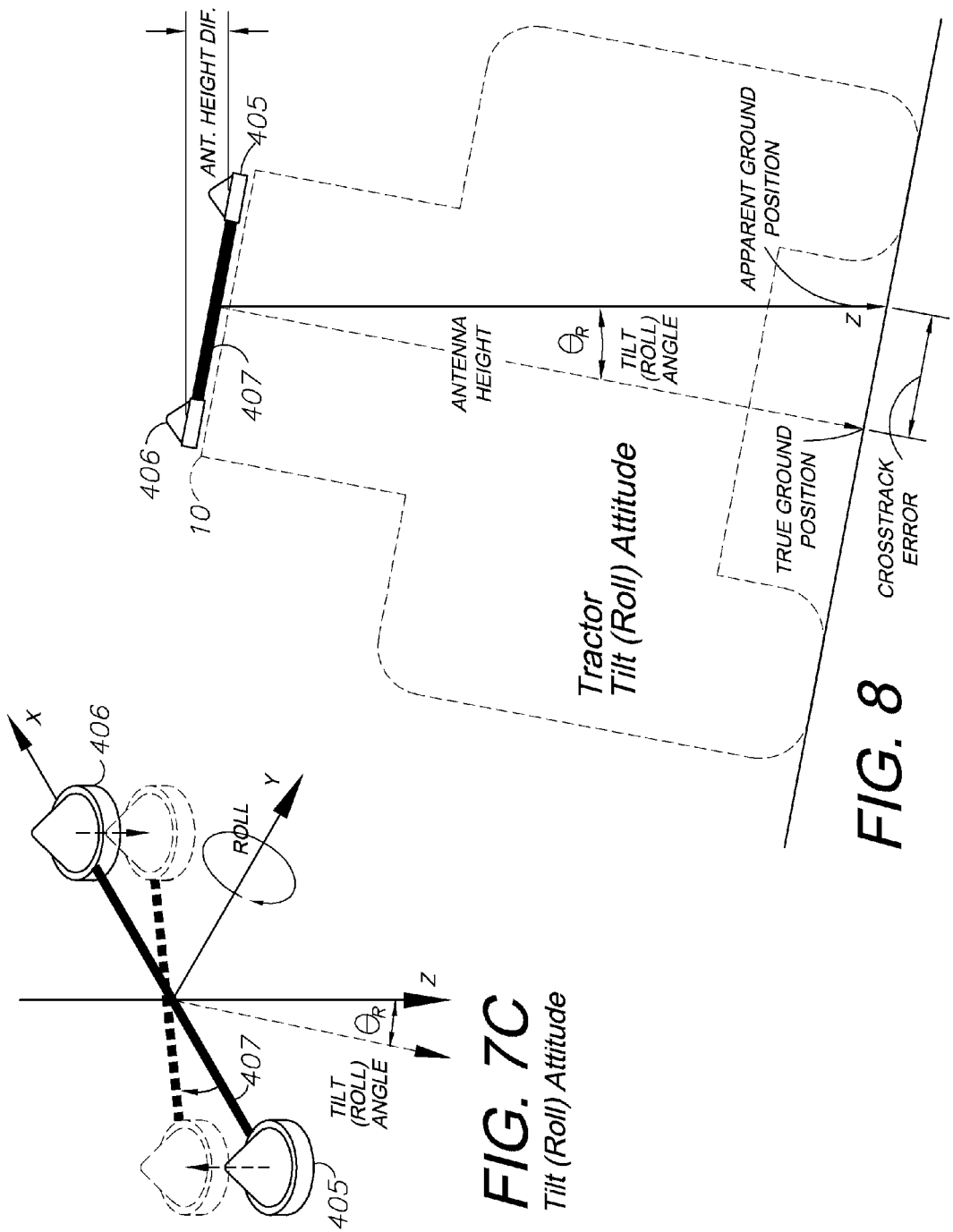
FIG. 7C depicts the system in a roll attitude.
FIG. 8 depicts a tilt (roll) angle measuring application of the invention on an agricultural vehicle.

FIG. 7B shows the system 402 in a yaw attitude or condition whereby the vehicle 10 has deviated from a desired heading along the Y axis to an actual heading by a yaw angle $\theta_Y$. In other words, the vehicle 10 has rotated (yawed) clockwise with respect to the Z axis. FIG. 7C shows the system 402 in a roll attitude or condition whereby the vehicle 10 has deviated from level to a tilt or roll angle of $\theta_R$. In other words, the vehicle 10 has rotated (rolled) counterclockwise with respect to the Y axis.

The system 402 includes roll and yaw gyros 430, 440 mounted and oriented for detecting vehicle rotational movement with respect to the Y and Z axes. The system 402 represents a typical strap-down implementation with the vehicle 10, antennas 405, 406 and gyros 430, 440 rigidly connected and moving together. A body-fixed coordinate system is thus defined with the three perpendicular axes XYZ.

In all but the most extreme farmlands, the vehicle 10 would normally deviate relatively little from level and horizontal, usually less than 30° in most agricultural operations. This simplifies the process of calibrating the gyros 430, 440 using the GNSS attitude system 402 consisting of two or more antennas 405, 406. For simplicity, it is assumed that the body-fixed axes XYZ remain relatively close to level. Thus, the change in the heading (yaw) angle $\theta_Y$ of FIG. 7B is approximately measured by the body-fixed yaw gyro 440, even though there may be some small discrepancy between the axes of rotation. Similar assumptions can be made for the roll angle $\theta_R$ (FIG. 7C), which is approximately measured by the body-fixed roll gyro 430. A similar assumption could be used for measuring pitch attitude or orientation angles with a pitch gyro.

This simplifying assumption allows the gyros to be decoupled from one another during integration and avoids the necessity of using a full strap-down quaternion implementation. For example, heading deviation is assigned only to the yaw gyro 440 (gyro axis perturbations from the assumed level axis alignment are ignored). Similarly, vehicle roll is assumed to be measured completely by a single roll gyro 430. GNSS attitude-measured heading and roll can then be used to calibrate the gyros 430, 440. Such simplifying assumptions tend to be relatively effective, particularly for agricultural operations on relatively flat, level terrain. Alternatively, a full six-degrees-of-freedom strap-down gyro implementation with quaternion integration could be employed, but such a solution would normally be excessive and represent an ineffective use of computing resources, unless an inertial navigation system (INS) was also being used to backup GNSS, for example, in the event of GNSS signal loss.

For the purpose of calibrating the gyroscopes 430, 440, the angles measured by the GNSS attitude system 402 are used as truth in a Kalman filter estimator of gyro bias and scale factor errors. Over a small interval of time, T, the following equation holds:

$$\vec{\theta}_{gyro}T = A\theta_{true} + BT$$

Where
$\vec{\theta}_{gyro}$=average gyro reading over $$T = 1/n \sum_n \dot{\theta}_{gyro}$$

(with n readings taken over time T)
$\theta_{true}$=truth angular change over interval T as measured by the GNSS attitude system.
A=gyro scale factor error
B=gyro rate bias error A two state Kalman filter is defined to have the gyro rate basis and scale factor error as states. The Kalman process model is a first-order Markov:

$$X_{k+1} = \begin{bmatrix} 1 & 0 \\ 0 & 1 \end{bmatrix} X_k + \begin{bmatrix} \sigma_A & 0 \\ 0 & \sigma_B \end{bmatrix} W_k$$

where the state vector X=[A B]
Here $\sigma_A$ and $\sigma_B$ are noise amplitudes and W is white noise. This dictates what is known as a random walk of the state [A B]. The designer of the Kalman filter chooses $\sigma_A$ and $\sigma_B$ according to how rapidly the bias and scale factor errors are expected to vary (usually variations due to temperature dependencies of scale and bias in a low cost gyro). Typical variations, especially of the scale factor, are quite small (A and B are nearly constant), and $\sigma_A$ and $\sigma_B$ are chosen accordingly. Typical values for a low-cost gyroscope, using a time interval T are:

$$\sigma_A = \frac{0.02T}{1200}, \sigma_B = \frac{T}{1200}$$

where T is expressed in seconds and 1200 means 1200 seconds. For example, here the random walk is chosen to cause a drift in scale factor of 0.02 in 1200 seconds. The Kalman measurement equation is:
y=Hx+v
Where
y=$\vec{\theta}_{gyro}$T, H=[$\theta_{true}$T] and v is measurement noise. The Kalman covariance propagation and gain calculation is designed according to well-known techniques.

Similar Kalman filters are deployed in both yaw and roll (and/or pitch) channels. The GNSS attitude devices 20 provides a reference yaw and roll that act as the Kalman measurements enabling the calibration of gyro rate basis and scale factor errors. The GNSS device provides heading and roll, even when the vehicle is stationary or traveling in reverse. This provides a significant advantage over single-antenna systems which provide a vehicle direction only when moving (i.e., a velocity vector). The multi-antenna attitude device 20 enables continuous calibration regardless of whether or not and in what direction the vehicle 10 is moving.

The calibrated gyros 430, 440 are highly advantageous in a vehicle steering control system. High precision heading and heading-rate produced by the calibrated yaw gyro is a very accurate and instantaneous feedback to the control of vehicle changes in direction. The angular rate produced by the gyro is at least an order of magnitude more accurate than the angular rate produced by pure GNSS systems, even those with multiple antennas. The system 402 is also very responsive. The feedback control needs such relatively high accuracy and responsiveness in heading and heading-rate to maintain control loop stability. It is well known that rate feedback in a control loop enhances stability. On a farm vehicle, where vehicle dynamics may not be fully known or modeled, this aspect is particularly important. The rate term allows a generic control system to be developed which is fairly insensitive to un-modeled vehicle dynamics. A relatively accurate heading and heading-rate-of-turn can be calculated for use in a vehicle automatic steering system.

Another advantage of the system 402 is that a gyro calibrated to measure tilt angle can provide the vehicle's tilt much more accurately than a system relying exclusively on GNSS positioning signals. This advantage is particularly important in high-precision autosteering, e.g., to the centimeter level. Errors in GNSS attitude are effectively increased by the ratio of the antenna spacing to the mounted height of the antennas above the ground, as illustrated in FIG. 8, which shows an attitude system 402 comprising a pair of antennas 405, 406 connected by a link 407, as described above. The system 402 is shown tilted through a tilt (roll) angle $\theta_R$. An imaginary antenna height line perpendicular to the rigid link 407 is projected to the "true" ground position of the vehicle 10 in FIG. 8 and forms the roll angle with respect to the Z axis. The relative antenna height differential can be projected along the vertical Z axis to a ground intercept point and establishes a cross-track error (distance between the vehicle true ground position and the Z axis ground intercept point), whereby errors in the antenna height differential are amplified by the ratio of the rigid link 407 length to the antenna height. The spacing of the antennas 405, 406, which corresponds to the length of the rigid link 407, is typically limited by the width of the vehicle 10, which can be relatively tall, thereby resulting in a relatively large antenna height-to-spacing ratio, e.g., five-to-one. Furthermore, noise-induced errors present in GNSS relative antenna height differentials (e.g., carrier phase noise, etc.) will be multiplied by this ratio, which can cause steering errors, including steering oscillations, etc.

The GNSS attitude system 402 utilizes a roll gyro (e.g., 430) for measuring rate-of-change of the roll angle, rather than the absolute roll angle, which rate of change is integrated to compute absolute roll angle. The constant of integration can be initialized to the current GNSS-derived roll angle and then subsequently steered to the GNSS roll angle by filtering with a Hatch filter or similar filter used for smoothing the code phase against the carrier phase in the GNSS receivers. Relatively smooth vehicle roll estimates can thus be achieved with a gyro.

More specifically, in an exemplary embodiment, the filtering is supplemented by the equation:

$$\theta_{filter}(k) = \Delta_{gyro}(k) + Gain^*[\theta_{GNSS}(k) - \theta_{filter}(k-1) - \Delta_{gyro}(k)]$$

$$\Delta_{gyro}(k) = \theta_{gyro}(k) - \theta_{gyro}(k-1)$$

Where $\theta_{filter}(k)$ is the desired output roll angle (at time k) smoothed by gyro roll angle, but steered to GNSS roll angle. The GNSS roll (at time k) is $\theta_{GNSS}(k)$ while the raw gyro angular reading is $\theta_{gyro}(k)$ which is obtained by integrating gyro angular rate. The difference in gyro integrated rate over one time interval (k−1 to k) is denoted $\Delta_{gyro}(k)$. The filter bandwidth and weighting of the GNSS roll angle into the solution is set by the filter's gain (denoted Gain). One method to choose the gain is to assign Gain=T/τ where T is the time span from epoch to epoch and τ is a time-constant, typically much larger than T. The smaller the Gain, the less the GNSS roll angle is weighted into the solution. The gain is chosen to give a smooth filtered roll output, dominated by the low gyro noise characteristics, but also maintaining alignment with GNSS roll. Since the gyro is calibrated in terms of its scale and bias errors per the methods described earlier, the gain can be chosen to be very small (much less than 1) and still the filtered roll angle closely follows the GNSS roll angle, but without the noise of the GNSS derived roll angle. Similar schemes can be deployed for pitch and heading angles if needed, all with the benefit of improved steering if such angles are used in the steering control feedback.

Figure 9:
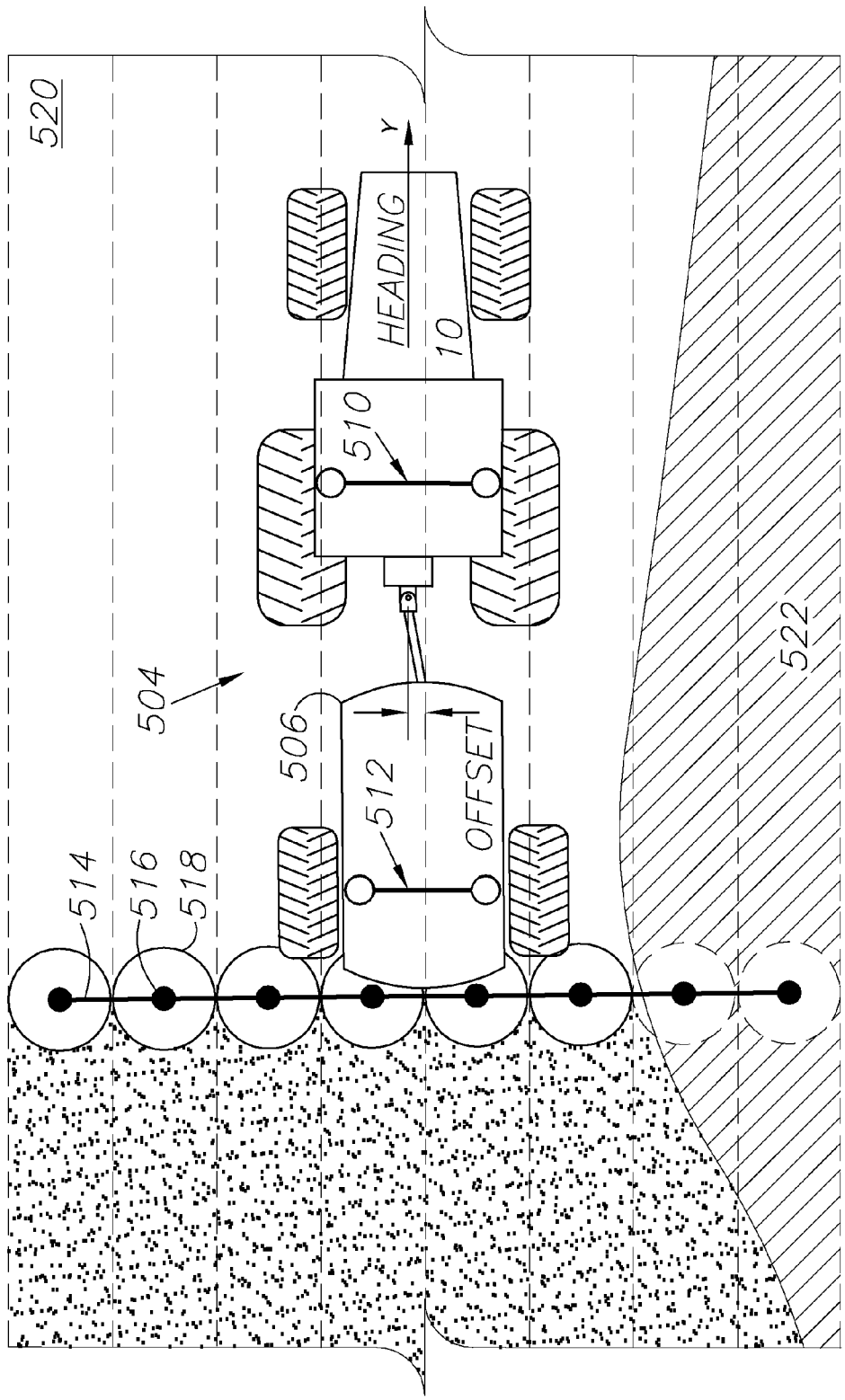
FIG. 9 depicts an alternative aspect of the system with antenna and gyroscope subsystems mounted on both the vehicle and the implement, e.g. a sprayer with selectively controllable spray nozzles.

FIG. 9 shows a GNSS and gyroscopic control system 502 comprising an alternative aspect of the present invention in a tractor and sprayer agricultural equipment application 504. The vehicle (e.g., a motive component or tractor) 10 is connected to a working component (e.g., a sprayer) 506 by an articulated connection 508, which can comprise a conventional tongue-and-hitch connection, or a powered, implement steering system or hitch, such as those shown in U.S. Pat. No. 6,865,465, No. 7,162,348 and No. 7,373,231, which are assigned to a common assignee herewith and are incorporated herein by reference.

The tractor 10 and the sprayer 506 mount tractor and sprayer GNSS antenna and gyroscope attitude subsystems 510, 512 respectively, which are similar to the system 402 described above and provide GNSS-derived position and attitude outputs, supplemented by gyro-derived rate of rotation outputs for integration by the control system 502. The sprayer 506 includes a spray boom 514 with multiple nozzles 516 providing spray patterns 518 as shown, which effectively cover a swath 520. The system 502 can be programmed for selectively controlling the nozzles 516. For example, a no-spray area 522 is shown in FIG. 9 and can comprise, for example, an area previously sprayed or an area requiring spray. Based on the location of the no-spray area 522 in relation to the spray boom 514, one or more of the nozzles 516 can be selectively turned on/off. Alternatively, selective controls can be provided for other equipment, such as agricultural planters wherein the seed boxes can be selectively turned on/off.

Figure 10:
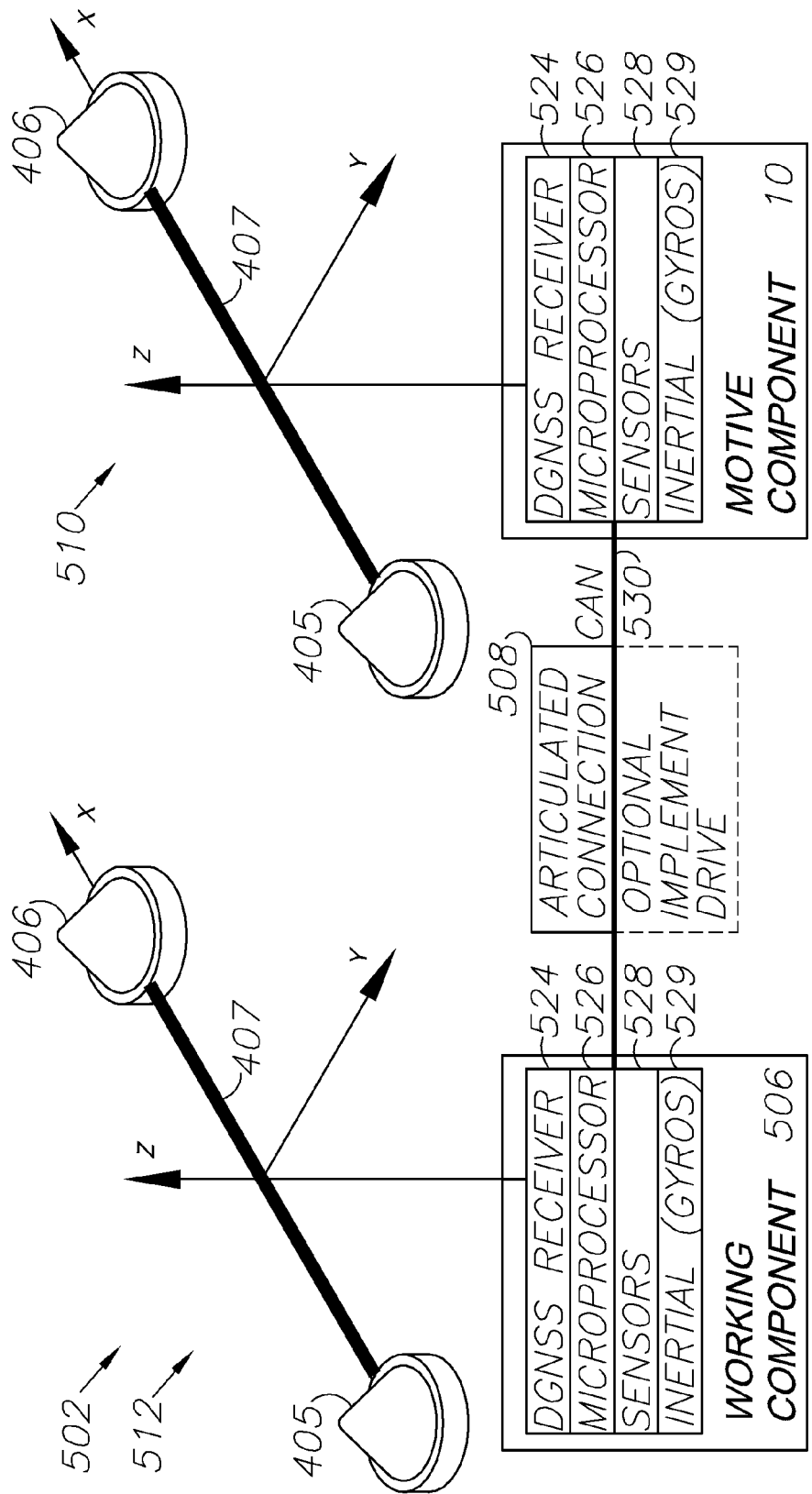
FIG. 10 depicts a block diagram of the system shown in FIG. 9.

FIG. 10 shows some of the major components of the system 502, including the GNSS antenna and gyroscope attitude subsystems 510, 512 with antennas 405, 406 separated by rigid links 407, as described above, and inertial gyros 514. The tractor and implement 10, 506 can be equipped with comparable systems including DGNSS receivers 524, suitable microprocessors 526 and the inertial gyros 529. Additional sensors 528 can include wheel counters, wheel turn sensors, accelerometers, etc. The system components can be interconnected by a CAN connection 530. Alternatively, components can be wirelessly interconnected, e.g., with RF transmitters and receivers.

In operation, the functions described above can be implemented with the system 502, which has the additional advantage of providing GNSS and gyro-derived positioning and attitude signals independently from the tractor 10 and the implement 506. Such signals can be integrated by one or both of the microprocessors 526. The tractor 10 can be automatically steered accordingly whereby the implement 506 is maintained on course, with the additional feature of selective, automatic control of the nozzles 516. For example, FIG. 9 shows the course of the tractor 10 slightly offset to the course of the sprayer 516, which condition could be caused by a downward left-to-right field slope. Such sloping field conditions generate roll attitudes, which could also be compensated for as described above. For example, the system 502 can adjust the output from the spray nozzles 516 to compensate for such variable operating conditions as sloping terrain, turning rates, tire slippage, system responsiveness and field irregularities whereby the material is uniformly applied to the entire surface area of the field. Moreover, the GNSS-derived positioning and heading information can be compared to actual positioning and heading information derived from other sensors, including gyros, for further calibration.

While the description has been made with reference to exemplary embodiments, it will be understood by those of ordinary skill in the pertinent art that various changes may be made and equivalents may be substituted for the elements thereof without departing from the scope of the disclosure. In addition, numerous modifications may be made to adapt the teachings of the disclosure to a particular object or situation without departing from the essential scope thereof. Therefore, it is intended that the claims not be limited to the particular embodiments disclosed as the currently preferred best modes contemplated for carrying out the teachings herein, but that the claims shall cover all embodiments falling within the true scope and spirit of the disclosure.

The invention claimed is:

1. A method of controlling a vehicle including a steering control mechanism, which method comprises the steps of:
   computing a position and a heading for the vehicle using a GNSS multiple antenna system in combination with a rate gyro;
   computing a steering control command using said vehicle position and heading;
   applying said steering control command to the vehicle steering mechanism;
   providing the vehicle steering control mechanism with a control value corresponding to the performance of the vehicle;
   steering said vehicle with said steering control mechanism utilizing said steering control command and said control value;
   basing the steering control command on a first proportionality factor multiplied by a difference in a desired position versus an actual position plus a second proportionality factor multiplied by a difference in a desired heading versus an actual heading;
   insuring with said second proportionality factor that when said vehicle attains said desired position the vehicle is also directed to said desired heading, and thereby avoids crossing a desired track;
   using a recursive, adaptive algorithm using said first and second proportionality factors to characterize the vehicle response and selected dynamic characteristics;

calculating response times and characteristics for the vehicle based on said responses; and calibrating said steering control command by applying a modified steering control command based on said responses to achieve a desired response.

2. The method of controlling a vehicle according to claim 1, which includes the additional steps of:

providing adaptive control tracking loops;

providing a wheel velocity sensor;

tracking vehicle wheel velocity with said wheel sensor;

providing a steering direction sensor;

monitoring wheel direction with said steering direction sensor; and providing limits and assistance in closing said adaptive control tracking loops with said wheel velocity and direction sensors.

3. The method of controlling a vehicle according to claim 2, which includes the additional steps of:

comparing a GNSS-based velocity, a GNSS-based heading and the rate gyro outputs with the wheel velocity sensor output and the steering direction sensor output; and using said output comparisons to model vehicle slippage and the actual steering rate conditions to enhance the adaptive control loops.

4. A method of controlling a vehicle including a steering control mechanism, which method comprises the steps of:

computing a position and a heading for the vehicle using a GNSS multiple antenna system in combination with a rate gyro;

computing a steering control command;

applying selected control values to the vehicle steering control mechanism;

basing the steering control command on a first proportionality factor multiplied by a difference in a desired position versus an actual position plus a second proportionality factor multiplied by a difference in a desired heading versus an actual heading, said second proportionality factor insuring that when said vehicle attains said desired position the vehicle is also directed to said desired heading, and thereby avoids crossing a desired track;

using a recursive, adaptive algorithm to characterize the vehicle response and selected dynamic characteristics;

calculating response times and characteristics for the vehicle based on said responses; calibrating said steering control commands command by applying a modified control command based on said responses to achieve a desired response;

providing a wheel sensor;

tracking vehicle wheel velocity with said wheel sensor;

providing a steering sensor;

monitoring wheel direction with said steering sensor;

providing adaptive control loops for the steering control command;

providing limits and assistance in closing tracking loops with said wheel velocity and direction;

comparing the GNSS-based and gyro-based position and heading for the vehicle with the wheel velocity and direction to model the slippage and the steering rate conditions to enhance the adaptive control loops;

providing said vehicle with a sprayer including multiple spray nozzles or applicators for applying material to a surface;

applying materials using the rate of change of tilt to adjust spray nozzle or applicator rates to compensate for roll or tilt of terrain; and varying the rates of application of the nozzles or applicators based on turn rates derived by the gyros and the GNSS multiple antenna system to apply materials in a desired rate.

5. A sensor system for controlling a vehicle steering system, which sensor system comprises:

a global navigation satellite sensor (GNSS) attitude subsystem including at least one receiver and multiple antennas connected to said receiver or receivers at a fixed spacing, said GNSS attitude subsystem computing vehicle position and attitude using measured GNSS carrier phase differences;

a yaw gyroscope connected to said GNSS attitude subsystem and configured to derive and provide outputs including yaw angles and angular rates of change;

said yaw gyroscope being configured for calibration and initialization using said GNSS-derived attitude; and a steering control subsystem connected to said yaw gyroscope and said GNSS attitude subsystem and using said yaw angle and yaw angle rate of change outputs from said yaw gyroscope for computing and outputting steering control commands to the vehicle steering system from the current position and heading to a desired position and heading.

6. The sensor system according to claim 5 wherein said steering control subsystem is configured for:

basing the steering control command on a first proportionality factor multiplied by a difference in a desired position versus an actual position plus a second proportionality factor multiplied by a difference in a desired heading versus an actual heading; and insuring with said second proportionality factor that when said vehicle attains said desired position the vehicle is also directed to said desired heading, and thereby avoids crossing a desired track.

7. The sensor system according to claim 5, wherein said steering control subsystem includes:

a recursive, adaptive algorithm characterizing the vehicle response and selected dynamic characteristics;

said steering control subsystem configured for calculating response times and characteristics for the vehicle based on said responses; and said steering control subsystem configured for calibrating said steering control command by applying a modified steering control command based on said responses to achieve a desired response.

8. The sensor system according to claim 5, which includes:

a wheel velocity sensor adapted for providing an output corresponding to wheel velocity; a steering direction sensor adapted for providing output corresponding to wheel direction; and said steering control subsystem configured for providing adaptive control tracking loops; and limits and assistance in closing said adaptive control tracking loops with the output from said wheel velocity and direction sensors.

9. The sensor system according to claim 5 wherein said steering control subsystem is configured for:

comparing GNSS-based velocity, GNSS-based heading and the rate gyro outputs with wheel velocity sensor output and steering direction sensor output; and using said output comparisons to model vehicle slippage and the actual steering rate conditions to enhance adaptive control loops for the steering control command.

10. The sensor system according to claim 5, which includes:
 a sprayer associated with said vehicle and including multiple spray nozzles or applicators for applying material to a surface; and
 said sprayer control function applying material using a rate of change of terrain tilt to adjust spray nozzle or applicator rates to compensate for terrain tilt.

11. The sensor system according to claim 10, which includes:
 said sprayer control function varying the rates of application of the nozzles or applicators based on turn rates calculated by the attitude subsystem to apply the materials at a desired rate.

12. The sensor system according to claim 5, which includes:
 said attitude subsystem comprising a tow vehicle attitude subsystem associated with a tow vehicle;
 an implement attitude subsystem associated with an implement connected to the tow vehicle by an articulated connection;
 said implement attitude subsystem including a GNSS receiver and at least two GNSS antennas mounted on said implement and spaced apart in a fixed, predetermined relation by a rigid link; said implement attitude subsystem including yaw and roll gyroscopes adapted for measuring rates of yaw and roll attitude change or said implement;
 said implement attitude subsystem adapted for calculating yaw and roll for the implement with output from said implement GNSS receiver and gyroscopes; and
 said sensor system correcting the implement's travel path with the vehicle steering mechanism.

13. The sensor system according to claim 5, which includes:
 said steering control subsystem including a microprocessor controller;
 said two GNSS attitude subsystems providing output to said microprocessor controller;
 said microprocessor controller computing steering commands by integrating said vehicle and implement attitude subsystem outputs; and
 said microprocessor controller providing said vehicle and implement integrated steering commands to said steering control mechanism.

14. The sensor system according to claim 5, which includes:
 an enclosure adapted for mounting in a fixed, predetermined orientation on said vehicle; and
 said GNSS receiver, antennas and gyroscope being mounted in or on said enclosure.

15. A method of controlling a vehicle including a steering control mechanism, which method comprises the steps of:
 computing a position and a heading for the vehicle using a GNSS multiple antenna system in combination with a rate gyro;
 computing a steering control command using said vehicle position and heading;
 applying said steering control command to the vehicle steering mechanism;
 providing the vehicle steering control mechanism with a control value corresponding to the performance of the vehicle;
 steering said vehicle with said steering control mechanism utilizing said steering control command and said control value; and
 providing said vehicle with a sprayer including multiple spray nozzles or applicators for applying material to a surface; and
 applying material using a rate of change of terrain tilt to adjust spray nozzle or applicator rates to compensate for terrain tilt.

16. The method of controlling a vehicle according to claim 15, which includes the additional steps of:
 varying the rates of application of the nozzles or applicators based on turn rates calculated by the gyro and the GNSS receivers multiple antenna system to apply the materials at a desired rate.

17. A method of controlling a vehicle including a steering control mechanism, which method comprises the steps of:
 computing a position and a heading for the vehicle using a GNSS multiple antenna system in combination with a rate gyro;
 computing a steering control command using said vehicle position and heading;
 applying said steering control command to the vehicle steering mechanism;
 providing the vehicle steering control mechanism with a control value corresponding to the performance of the vehicle;
 steering said vehicle with said steering control mechanism utilizing said steering control command and said control value; and
 providing the vehicle with a tow vehicle and an implement connected to the tow vehicle by an articulated connection;
 providing said implement with an implement attitude subsystem including a GNSS receiver and at least two GNSS antennas spaced apart in a fixed, predetermined relation by a rigid link;
 providing said implement attitude subsystem with yaw and roll gyroscopes adapted for measuring rates of yaw and roll attitude change for said implement;
 calculating the implement's attitude values including tilt, slew, heading, yaw rate and roll rate with output from said implement GNSS receiver and said gyroscopes; and
 correcting the implement's travel path with the vehicle steering mechanism using said calculated implement attitude values.

18. The method of controlling a vehicle according to claim 17, which includes the additional steps of:
 providing said tow vehicle with a tow vehicle attitude subsystem including a GNSS receiver and at least two GNSS antennas spaced apart in a fixed, predetermined relation by a rigid link;
 providing said tow vehicle attitude subsystem with yaw and roll gyroscopes adapted for measuring rates of yaw and roll attitude change for said tow vehicle;
 calculating yaw and roll rates for the tow vehicle with output from said implement GNSS receiver and gyroscopes;
 providing said steering control system with a microprocessor controller;
 providing output from said tow vehicle and implement attitude subsystems to said microprocessor controller;
 computing steering commands by integrating said tow vehicle and implement attitude subsystem outputs; and
 providing said tow vehicle and implement integrated steering commands to said steering control mechanism.

19. A method of controlling a vehicle including a steering control mechanism, which method comprises the steps of:
 computing a position and a heading for the vehicle using a GNSS multiple antenna system computing a steering control command using said vehicle position and heading;
applying said steering control command to the vehicle steering mechanism;
providing the vehicle steering control mechanism with a control value corresponding to the performance of the vehicle;
steering said vehicle with said steering control mechanism utilizing said steering control command and said control value; and
computing vehicle position and attitude with a GNSS attitude subsystem multi-antenna system using measured GNSS carrier phase differences;
providing a yaw gyroscope connected to said GNSS attitude subsystem; calibrating and initializing said yaw gyroscope with said GNSS-derived attitude;
configuring said yaw gyroscope to derive and provide an output including a yaw angle and a yaw angle rate of change and deriving and providing such output; and
using yaw angle and said yaw angle rate of change outputs from said yaw gyroscope for computing and outputting steering control commands to the vehicle steering system from the current position and heading to a desired position and heading.

* * * * *